US012796676B2

(12) United States Patent
Kanagaraj et al.

(10) Patent No.: US 12,796,676 B2
(45) Date of Patent: Nov. 17, 2026

(54) SYSTEM MOUNTED IN A VEHICLE FOR AGRICULTURAL APPLICATION AND METHOD OF OPERATION OF THE SYSTEM

(71) Applicant: Tartan Aerial Sense Tech Private Limited, Bangalore (IN)

(72) Inventors: Dhivakar Kanagaraj, Karur (IN); Raghul Raghu, Madurai (IN); Pranav MP, Bengaluru (IN)

(73) Assignee: TARTAN AERIAL SENSE TECH PRIVATE LIMITED, Bangalore (IN)

( * ) Notice: Subject to any disclaimer, the term of this patent is extended or adjusted under 35 U.S.C. 154(b) by 388 days.

(21) Appl. No.: 18/395,037

(22) Filed: Dec. 22, 2023

(65) Prior Publication Data

US 2024/0206454 A1 Jun. 27, 2024

(30) Foreign Application Priority Data

Dec. 26, 2022 (IN) ............................. 202241075496

(51) Int. Cl.
*A01M 7/00* (2006.01)
*G06V 20/10* (2022.01)

(52) U.S. Cl.
CPC ......... *A01M 7/0089* (2013.01); *G06V 20/188* (2022.01)

(58) Field of Classification Search
CPC .............. A01M 7/0089; A01M 21/043; G06V 20/188; G06V 10/82
See application file for complete search history.

(56) References Cited

U.S. PATENT DOCUMENTS 10,721,859 B2 * 7/2020 Wu ...................... A01C 21/007
11,310,954 B2 * 4/2022 Pickett ................ A01M 7/0092
(Continued)

FOREIGN PATENT DOCUMENTS

BR 102022006844 A2 11/2022
CN 114818909 A * 7/2022 ............. G06N 3/045
(Continued)

OTHER PUBLICATIONS

Alam et al., Real-Time Machine-Learning Based Crop/Weed Detection and Classification for Variable-Rate Spraying in Precision Agriculture, 2020, retrieved from—https://ieeexplore.ieee.org/stamp/stamp.jsp?t (Year: 2020).*
(Continued)

*Primary Examiner* — Yongjia Pan
(74) *Attorney, Agent, or Firm* — Barta Jones, PLLC

(57) ABSTRACT

A system mounted in a vehicle includes a boom arrangement, which includes a predefined number of electronically controllable sprayer nozzles and a plurality of image-capture devices. One or more hardware processors of the system are configured to distinguish crop plants from weeds using trained AI model when the vehicle is motion based on sequence of images obtained from the plurality of image-capture devices. The distinguishing of the crop plants from weeds includes detecting a first set of crop plants with drooping leaves, detecting a second set of crop plants manifesting an elastic change in physical characteristics of the second set of crop plants; and detecting a third set of remaining crop plants. Such holistic detection ensures that no crop plant goes undetected and cause a specific set of electronically controllable sprayer nozzles to operate accordingly.

18 Claims, 12 Drawing Sheets

(56) References Cited

U.S. PATENT DOCUMENTS

| | | | | |
|---|---|---|---|---|
| 2013/0034263 | A1* | 2/2013 | Ding | G06V 10/7715<br>382/103 |
| 2014/0001276 | A1* | 1/2014 | Joergensen | A01M 21/043<br>239/69 |
| 2014/0180549 | A1* | 6/2014 | Siemens | A01B 39/18<br>701/50 |
| 2018/0330166 | A1* | 11/2018 | Redden | G06V 10/764 |
| 2019/0150357 | A1* | 5/2019 | Wu | H04N 23/51 |
| 2020/0193589 | A1* | 6/2020 | Peshlov | G06T 7/0004 |
| 2021/0153500 | A1* | 5/2021 | Kuenzi | G06V 10/56 |
| 2021/0185886 | A1* | 6/2021 | Sibley | G05D 1/0274 |
| 2021/0235641 | A1* | 8/2021 | Boudreau | G05B 19/4155 |
| 2022/0211026 | A1* | 7/2022 | McCann | B64D 1/18 |
| 2024/0007822 | A1* | 1/2024 | Young | G06N 20/00 |
| 2024/0074428 | A1* | 3/2024 | Mccann | G06V 20/17 |
| 2024/0196879 | A1* | 6/2024 | Philipsen | A01M 7/0089 |
| 2025/0248387 | A1* | 8/2025 | Marckmann | H04N 23/54 |

FOREIGN PATENT DOCUMENTS

| | | | | |
|---|---|---|---|---|
| WO | 20211167470 | A1 | 8/2021 | |
| WO | WO-2022128189 | A1 * | 6/2022 | A01M 7/0089 |

OTHER PUBLICATIONS

Geldhof et al., A digital sensor to measure real-time leaf movements and detect abiotic stress in plants, Aug. 30, 2021, retrieved from—https://pmc.ncbi.nlm.nih.gov/articles/PMC8566216/pdf/kiab407.pdf, 18 pages (Year: 2021).*

Dabhi et al., crop and weed detection data with bounding boxes, 2020, retrieved from—https://www.kaggle.com/datasets/ravirajsinh45/crop-and-weed-detection-data-with-bounding-boxes/data, 2 pages (Year: 2020).*

* cited by examiner

SYSTEM MOUNTED IN A VEHICLE FOR AGRICULTURAL APPLICATION AND METHOD OF OPERATION OF THE SYSTEM

CROSS-REFERENCE TO RELATED APPLICATIONS/INCORPORATION BY REFERENCE

This patent application makes reference to, claims the benefit of, and claims priority to an Indian Patent Application No. 202241075496 filed on Dec. 26, 2022, which is incorporated herein by reference in its entirely, and for which priority is hereby claimed under the Paris Convention and 35 U.S.C. 119 and all other applicable law.

TECHNICAL FIELD

The present disclosure relates generally to the field of agricultural machines and systems; and more specifically, to a system (i.e., an electro-mechanical agricultural equipment) mounted in a vehicle for performing for an agricultural application and a method of operation of the system.

BACKGROUND

With the rapid advancement of agricultural machines, implements, special-purpose vehicles, and vehicle mounted apparatus, productivity in agricultural operations have increased. However, existing vehicle-based systems are very complex in nature, where a particular system or machinery works only when it is from a same manufacturer. In other words, one system of one manufacturer is not compatible with another system of another manufacturer. This binds a farmer to use costly machineries and agricultural implements of one specific-manufacturer. For example, it is sometimes simply not possible or very technically challenging to use a conventional camera system of one manufacturer with another system of another manufacturer as cross-talk among different electronics and mechatronics systems is generally restricted or severely limited in use.

There are many other technical problems with conventional systems and methods in terms of how to identify crop plants in the uneven land area of the agricultural field given the uncertainty in surrounding environmental conditions when the images are captured in motion i.e., when the vehicle carrying the camera system is in motion. In one example, camera-based systems are known to aid in different operations in an agricultural field. However, uneven land area of the agricultural field combined with uncertainty in surrounding environmental conditions while capturing images of agricultural field (e.g., variation in sunlight due to either clouds, rain, a shadow of a large object, like tree, while capturing an image, change in position of sun throughout the day, light intensity, a time of day when farming is done etc.) are found to severely and adversely impact the existing image acquisition systems that are used in agricultural machines or implements. The existing systems either fail or accuracy is severely impacted in such conditions. This causes the conventional machines, systems, and methods to misbehave or causes errors to differentiate between two green looking objects (e.g., crop plants and weeds). In another example, there is a problem of over-engineering, i.e., too many sensor units, too much processing, and very complex machines. In such a situation, the chances of errors are high due to multiple failure points and at the same time makes such machines very costly, power intensive, and processing intensive, which are not suited for many sub-urban, urban, or rural farming conditions and needs. For instance, some existing systems use chlorophyll sensors or detectors to supplement or corroborate the visible-spectrum image-sensors. However, it is still observed the conventional camera systems many-a-times fail to identify crop plants in the uneven land area of the agricultural field given the uncertainty in surrounding environmental conditions when the images are captured in motion. In a second example, conventional systems or agricultural special-purpose vehicles require row identification, where row-based processing forms an indispensable component of conventional systems. Conventional systems fail when proper rows are not demarcated in agricultural field. In yet another example, conventional location determination techniques and systems, such as Global Positioning System (GPS) that is integrated with an agricultural vehicle for location determination. However, it is well-known that civilian use of GPS has an error-range of 1-10 meters, and sometimes more depending on signal reception issues in a particular area. Such errors cause intermittent issues in determining a location of a crop plant or weeds whenever there is a GPS signal fluctuation.

Further limitations and disadvantages of conventional and traditional approaches will become apparent to one of skill in the art through comparison of such systems with some aspects of the present disclosure as set forth in the remainder of the present application with reference to the drawings.

SUMMARY

The present disclosure provides a system (i.e., an electro-mechanical agricultural equipment) mounted in a vehicle for performing an agricultural application and a method of operation of the system. The present disclosure provides a solution to the existing problem of frequent misidentification of crop plants in presence of weeds in an uneven land area of the agricultural field given the uncertainty in surrounding environmental conditions when the images are captured in motion i.e., when the vehicle carrying the camera system is in motion. For example, the existing systems either fail or accuracy is severely impacted when images are captured in a changing surrounding environmental condition, causing erroneous processing and operations of the conventional machines and agricultural implements that are aided by camera systems. An aim of the present disclosure is to provide a solution that overcomes at least partially the problems encountered in prior art and provide an improved system that can be mounted in a vehicle for performing controlled and perceptive operations for an agricultural application with increased reliability in practice. The disclosed system is technically advanced in terms of detecting crop plants with advanced technology where even if there are some temporary or elastic changes in morphology of the crop plants, for example, drooping leaves, any elastic change in the physical characteristics like from movement of air across the crop plants, or a change in shape of leaves due to some external conditions. The disclosed system is able to accurately identify such crop plants with more than 98-100% accuracy in the uneven land area of the agricultural field even if there is any change in surrounding environmental conditions while the images are captured in motion. There is further provided an improved method of operation of the system which improves the perceptive ability of the system, which in turn improves the operations of the system.

These and other advantages, aspects, and novel features of the present disclosure, as well as details of an illustrated embodiment thereof, will be more fully understood from the following description and drawings.

BRIEF DESCRIPTION OF THE DRAWINGS

The summary above, as well as the following detailed description of illustrative embodiments, is better understood when read in conjunction with the appended drawings. Wherever possible, like elements have been indicated by identical numbers.

Embodiments of the present disclosure will now be described, by way of example only, with reference to the following diagrams wherein.

DETAILED DESCRIPTION OF THE DISCLOSURE

Figure 1A:
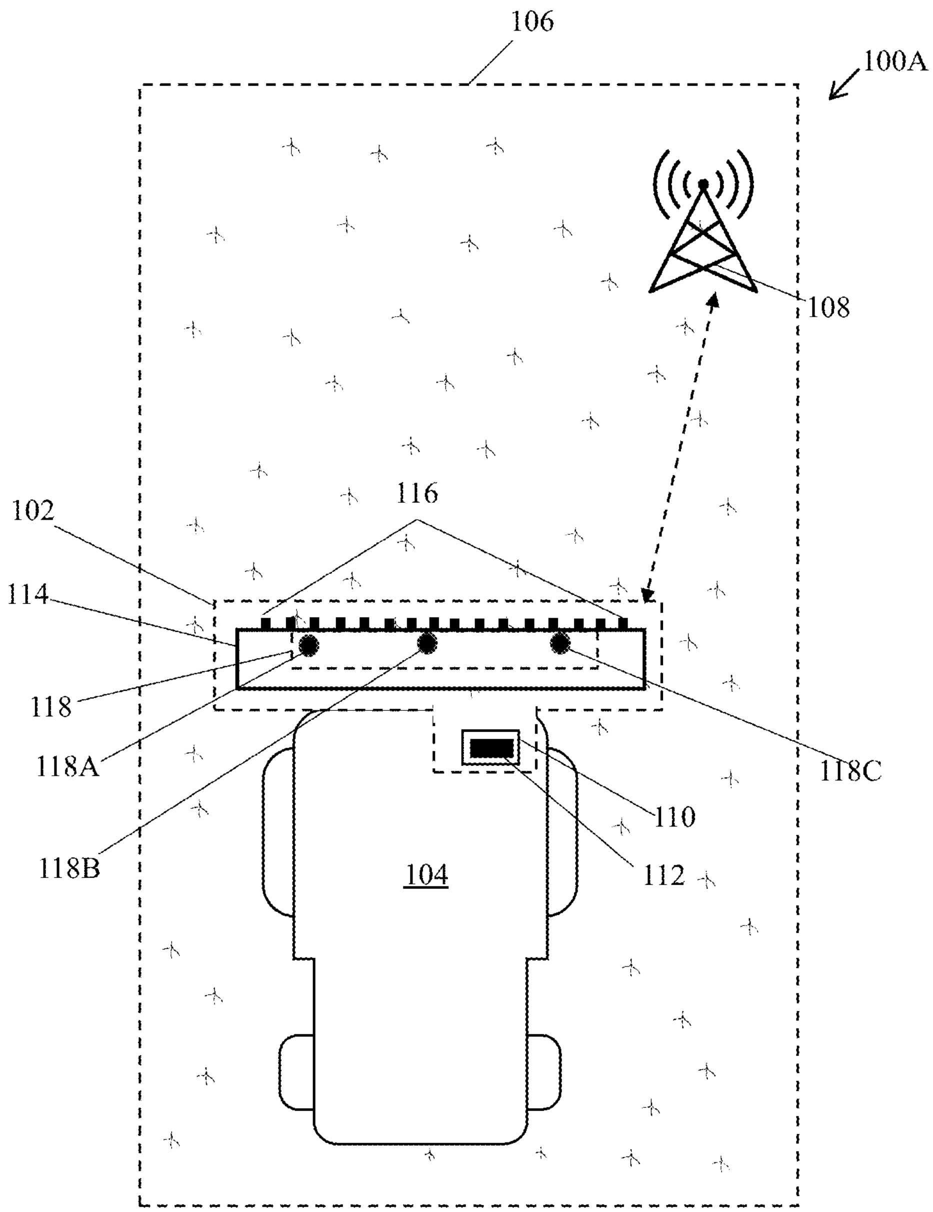
FIG. 1A is a diagram illustrating a system mounted in a vehicle for controlled and perceptive chemical spraying on an agricultural field, in accordance with an embodiment of the present disclosure.

Certain embodiments of the disclosure may be found in a system mounted in a vehicle for performing for an agricultural application and a method of operation of the system. In one aspect, the present disclosure provides the system mounted in the vehicle, where the system comprises a boom arrangement that includes a predefined number of electronically controllable sprayer nozzles, and a plurality of image-capture devices configured to capture a plurality of field-of-views (FOVs) of a plurality of defined areas of the agricultural field. The system includes one or more hardware processors configured to obtain a sequence of images corresponding to the plurality of FOVs from the plurality of image-capture devices, distinguish crop plants form weeds using a trained artificial intelligence (AI) model when the vehicle is in motion on the agricultural field. Moreover, the distinguishing of the crop plants from weeds using the pre-trained AI model includes detecting a first set of crop plant with drooping leaves, detecting a second set of crop plants manifesting an elastic change in physical characteristics of the second set of crop plants and detecting a third set of remaining crop plants different from the first set of crop plants and the second set of the crop plants. Furthermore, the one or more hardware processors are configured to cause a specific set of electronically controllable sprayer nozzles from amongst the predefined number of electronically controllable sprayer nozzles to operate based on the distinguishing of the crop plants from the weeds. Moreover, the distinguished crop plants comprise the first set of crop plant with drooping leaves, the second set of crop plants manifesting the elastic change in physical characteristics, and the third set of remaining crop plants.

The system in the present disclosure is technically advanced in terms of improved and reliable detection of crop plants and accurate distinguishing of the crop plants from weeds. For instance, even if some plants have drooping leaves or there are some temporary or elastic changes in morphology of the crop plants, for example, any elastic change in the physical characteristics like from movement of air across the crop plants, or a change in shape of leaves due to some external conditions, the system is able to detect without fail when the vehicle is in motion with an increased accuracy. This accuracy further cascades to the operation of the electronically controllable sprayer nozzles when a crop plant to be sprayed is beneath a given nozzle. Furthermore, the disclosed system is technically advanced from conventional systems in terms of improved operation of detecting of the crop plants by processing the images even if there are sudden jerks when the vehicle moves in the uneven land area of the agricultural field. The distinguishing of the crop plants from the weeds using the pre-AI model is used to accurately identify the crop plants with more than 98-100% accuracy in the uneven agricultural land even if there is any change in surrounding environmental conditions, such as change in shape of leaves due to wind, drooping of leaves, occlusion by weed, high weed density around the crop plants, and the like. This significantly improves the subsequent operations of the system and imparts a perceptive ability to adapt to uneven agricultural land and handle surprisingly advanced real-time changes in the surrounding environmental conditions.

In an implementation form, the pre-trained AI model is trained in a training phase by extracting a drooping leaf feature from a training dataset stored in a training database, extracting one or more leaf movement features from the training dataset, extracting one or more stem bending features from the training dataset, and extracting a plurality of features of a crop plant at different growth stages and at different times-of-day with and without surrounding weeds. Moreover, the plurality of features are indicative of physical characteristics of the crop plant at the different growth stages at the different times-of-day.

In the training phase, various advanced parameters, such as drooping of the leaves, movement of the leaves, bending of the stem, growth stage, weed density and the like, are taken into account. This improve the capability of the system itself that becomes perceptive and is able to accurately distinguish the crop plants from the weeds with more than 98-100% of accuracy even if there is any change in surrounding environmental conditions, such as change in shape of leaves due to wind, drooping of leaves, occlusion by weed, high weed density around the crop plants, and the like in practice.

In a further implementation form, the one or more hardware processors are configured to receive geospatial location correction data from an external device placed at a fixed location in the agricultural field and geospatial location coordinates associated with the boom arrangement mounted on the vehicle.

The use of the geospatial location correction data (e.g., real-time kinematic positioning (RTK) correction data) from the external device (e.g., an RTK base station) that is applied on the geospatial location coordinates obtained by a geospatial sensor provided in the boom arrangement, significantly improves the positional accuracy of the boom arrangement, i.e., provides a centimetre (cm) level accuracy of position of the boom arrangement when the vehicle is in motion.

In a further implementation form, the one or more hardware processors are configured to execute mapping of pixel data of the weeds or the crop plants in an image to distance information from a reference position of the boom arrangement when the vehicle is in motion. Moreover, the specific set of electronically controllable sprayer nozzles are operated further based on the executed mapping of pixel data.

By virtue of mapping of pixel data of weeds or the crop plant to distance information from the reference position of the boom arrangement when the vehicle is in motion, increases the accuracy of the system to detect the crop plants and the weeds in the agricultural field. This accuracy further cascades to the operation of the electronically controllable sprayer nozzles when a crop plant to be sprayed is beneath a given nozzle.

In a further implementation form, the one or more hardware processors are configured to detect a confidence threshold indicative of a detection sensitivity of the crop plant in the AI model and automatically include or exclude a category of plants to be considered for operation by the one or more hardware processors based on the detected confidence threshold.

Advantageously, the use of the defined confidence threshold further improves the perceptive capability of the system such that the detection of the crop plant is achieved with improved accuracy and precision much before actual action required on the crop plants, for example, perceptive spot chemical irrespective of any change in the surrounding environmental conditions while capturing images.

In a further implementation form, the one or more hardware processors are configured to update the defined confidence threshold in response to a change in a quality parameter of the captured plurality of FOVs of the plurality of defined areas of the agricultural field.

In such implementation, an increase or a decrease in the defined confidence threshold dynamically changes the detection sensitivity of the crop plant increasing the perceptive capability of the system making the system fail-safe. For instance, sudden change in surrounding conditions, such as leaf folding, leaves drooping, partial occlusion of crop plants by surrounding weeds, high weed density or different weed density around the crop plants etc. can be handled.

In a further implementation form, the one or more hardware processors are further configured to determine an upcoming time slot to spray a chemical based on the distinguishing of the crop plants from the weeds.

The use of the defined confidence threshold significantly improves the perceptive capability of the system such that the spraying of chemicals is achieved with improved accuracy and precision for the correct time slots, at correct intended areas or spots and only when required with correct amount of spray and correct selection of a type of chemical irrespective of any change in the surrounding environmental conditions while capturing images of crop plants in the agricultural field.

In a further implementation form, the one or more hardware processors are further configured to communicate control signals to operate a plurality of different sets of electronically controlled sprayer nozzles at different time instants during a spray session based on the distinguishing of the crop plants from the weeds. As a result of the improved perceptive ability of the system, the system is able to operate and control the different set of electronically controlled sprayer nozzles to release chemical at different time instants during the spray session. Moreover, such operation enables the system to behave differently for different type of crop plants and weeds that overall increases the productivity of the system in the agricultural field.

In another aspect, the present disclosure provides a method of operation of the system. The method comprises obtaining, by one or more hardware processors, a sequence of images corresponding to a plurality of field-of-views (FOVs) of a plurality of defined areas of the agricultural field from a plurality of image-capture devices mounted in a boom arrangement of a vehicle, distinguishing, by the one or more hardware processors, crop plants from weeds using a trained artificial intelligence (AI) model when the vehicle is motion on the agricultural field. Moreover, the distinguishing of the crop plants from weeds using the pre-trained AI model comprises detecting a first set of crop plant with drooping leaves, detecting a second set of crop plants manifesting an elastic change in physical characteristics of the second set of crop plants, and detecting a third set of remaining crop plants different from the first set of crop plants and the second set of the crop plants. Furthermore, the method comprises causing, by the one or more hardware processors, a specific set of electronically controllable sprayer nozzles from amongst the predefined number of electronically controllable sprayer nozzles to operate based on the distinguishing of the crop plants from the weeds, wherein the distinguished crop plants comprises the first set of crop plant with drooping leaves, the second set of crop plants manifesting the elastic change in physical characteristics, and the third set of remaining crop plants.

The method achieves all the advantages and technical effects of the system of the present disclosure. Furthermore, the method is technically advanced in terms of its perceptive ability and is intelligent enough to adapt to uneven agricultural land, is astutely perceptive to real-time changes in the surrounding environmental conditions, and not dependent on any row-identification. For example, in conventional methods and systems, if crops are planted in proper rows and columns in an agricultural field, then only camera-assisted or camera-aided machines can function in real-world conditions. Unlike the conventional systems, the disclosed method of the present invention does not need any prior plantation format to be followed.

It is to be appreciated that all the aforementioned implementation forms can be combined. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

FIG. 1A is a diagram illustrating a system mounted in a vehicle for controlled and perceptive spraying on an agricultural field, in accordance with an embodiment of the present disclosure. With reference to FIG. 1A, there is shown a diagram 100 that comprises a system 102 mounted in a vehicle 104. The vehicle 104 may be in a static state or in motion on an agricultural field 106. The system 102 includes a boom arrangement 114, which includes a predefined number of electronically controllable sprayer nozzles 116 and a plurality of image-capture devices 118 (such as a first image-capture device 118A, a second image-capture device 118B, and a third image-capture device 118C). There is further shown an external device 108 that is communicatively coupled to the system 102. In an implementation, the system 102 may further include a display device 110 for a user of the vehicle 104. In an implementation, a custom application 112 may be installed in the display device 110.

The system 102 is mounted in the vehicle 104 for an agricultural application. The system 102 includes the boom arrangement 114 that includes the predefined number of electronically controllable sprayer nozzles 116 and the plurality of image-capture devices 118 configured to capture a plurality of field-of-views (FOVs) of a plurality of defined areas of the agricultural field 106. The system 102 further includes one or more hardware processors (shown in FIG. 2) that are configured to obtain a plurality of images corresponding to the plurality of FOVs from the plurality of image-capture devices 118. The one or more hardware processors are further configured to receive geospatial location correction data from the external device 108 (e.g., an RTK base station) that is placed at a fixed location in the agricultural field 106 and geospatial location coordinates associated with the boom arrangement 114 mounted on the vehicle 104. The geospatial location correction data may be RTK correction data used to correct global navigation satellite system, such as GPS errors while the vehicle 104 is in motion. The use of the geospatial location correction data (e.g., real-time kinematic positioning (RTK) correction data) from the external device 108 that is applied on the geospatial location coordinates obtained by a geospatial sensor provided in the boom arrangement, significantly improves the positional accuracy of the boom arrangement 114 that is provides a centimetre (cm) level accuracy of position of the boom arrangement when the vehicle 104 is in motion. This improves the accuracy to determine a distance and position of an object-of-interest, such as a crop plant, with respect to the position of the plurality of image-capture devices 118 as such devices are also mounted on the boom arrangement 114. In the conventional systems, typically a global positioning system (GPS) sensor inbuilt in a vehicle is employed for calculation of time to spray chemicals, which reduces the location accuracy. The system is further described in detail, for example, in FIGS. 1B, 2A to 2C, 4, 5A, and 5B.

Figure 1B:
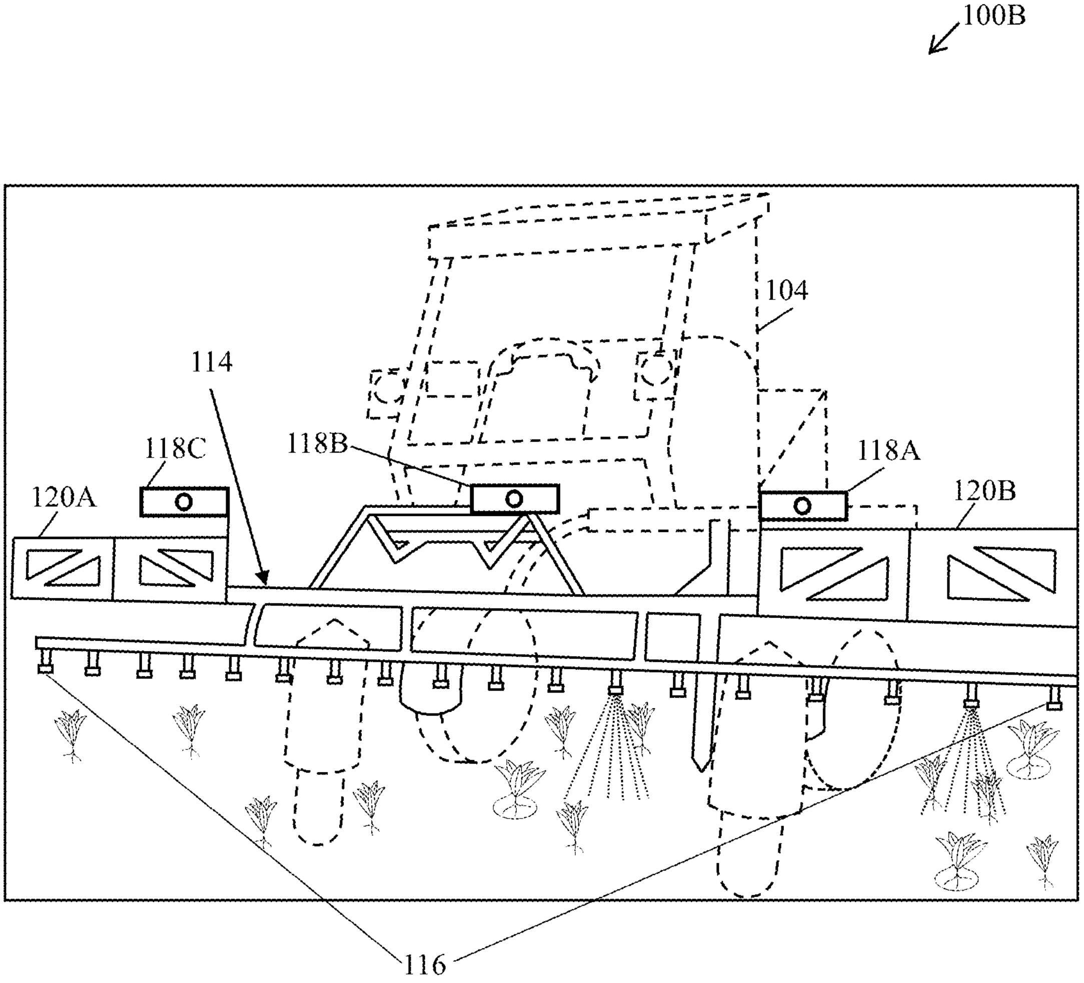
FIG. 1B is a diagram illustrating a boom arrangement mounted on a vehicle, in accordance with an embodiment of the present disclosure.

FIG. 1B is a diagram illustrating the boom arrangement mounted on a vehicle, in accordance with an embodiment of the present disclosure. FIG. 1B is described in conjunction with elements of FIG. 1A. With reference to FIG. 1B, there is shown the boom arrangement 114 mounted on the vehicle 104.

The boom arrangement 114 is removably mounted on the vehicle 104. The boom arrangement 114 includes one or more elongated booms that are interconnected through a single frame. The boom arrangement 114 comprises the predefined number of electronically controllable sprayer nozzles 116 and the plurality of image-capture devices 118. The predefined number of electronically controllable sprayer nozzles 116 are configured to spray a chemical on either a plurality of crop plants or weeds perceptively in a controlled manner, depending on an application scenario.

Each of the plurality of image-capture devices 118 may include suitable logic, circuitry, and/or interfaces that is configured to capture a plurality of field-of-views (FOVs) of a plurality of defined areas of the agricultural field 106 (of FIG. 1). In an implementation, the plurality of image-capture devices 118 are installed on the vehicle 104 (of FIG. 1A) and may include a left-side camera (e.g., a RGB camera), a right-side camera and a central camera. Examples of each of the plurality of image-capture devices 118 may include but not limited to, a RGB camera, a high dynamic range (HDR) camera, and the like. In an example, the boom arrangement 114 include one or more casings, such as a first box 120A, and a second box 120B that are used to store and protect the circuitry as well controller other electronics components (e.g., a controller) that are required for the functioning of the plurality of image-capture devices 118. Moreover, the plurality of image-capture devices 118 are arranged in a same plane in downward (i.e., lookdown) position. Similarly, the predefined number of electronically controllable sprayer nozzles 116 are also arranged in a same plane in the boom arrangement 114. In addition, each camera device from the plurality of image-capture devices 118 is arranged above the predefined number of electronically controllable sprayer nozzles 116 at a defined height. The defined height, i.e., a distance between the plane on which the plurality of image-capture devices 118 are arranged and the plane on which the predefined number of electronically controllable sprayer nozzles 116 are arranged is beneficially used by the one or more hardware processors (FIG. 2) to determine in advance precisely when to activate, which nozzles to activate, and a current distance between the boom arrangement and a plurality of crop plants that are to be sprayed when such crop plants reach almost underneath the predefined number of electronically controllable sprayer nozzles 116. A FOV may be set, for example, of 1 meter, to acquire higher resolution and detailing in the captured images. Therefore, such arrangement of the plurality of image-capture devices 118 provides enough buffer time to the one or more hardware processors to process the images, for example, for crop detection, crop tracking, distinguishing the crop plants from weeds. Furthermore, such buffer time is further used by the one or more processors to activate a specific set of electronically controllable sprayer nozzles at a specific time and to deactivate another set of electronically controllable sprayer nozzles in a proactive manner. In other words, such buffer time can be used by the one or more processors to determine a desired time in advance, such as to activate or deactivate the specific set of electronically controllable sprayer nozzles at a desired time. Moreover, the specific set of electronically controllable sprayer nozzles 116 are activated to spray at only intended areas or spots and only when required with correct amount of spray and correct selection of a type of chemical irrespective of any change in the surrounding environmental conditions while capturing images of the agricultural field 106.

Figure 2A:
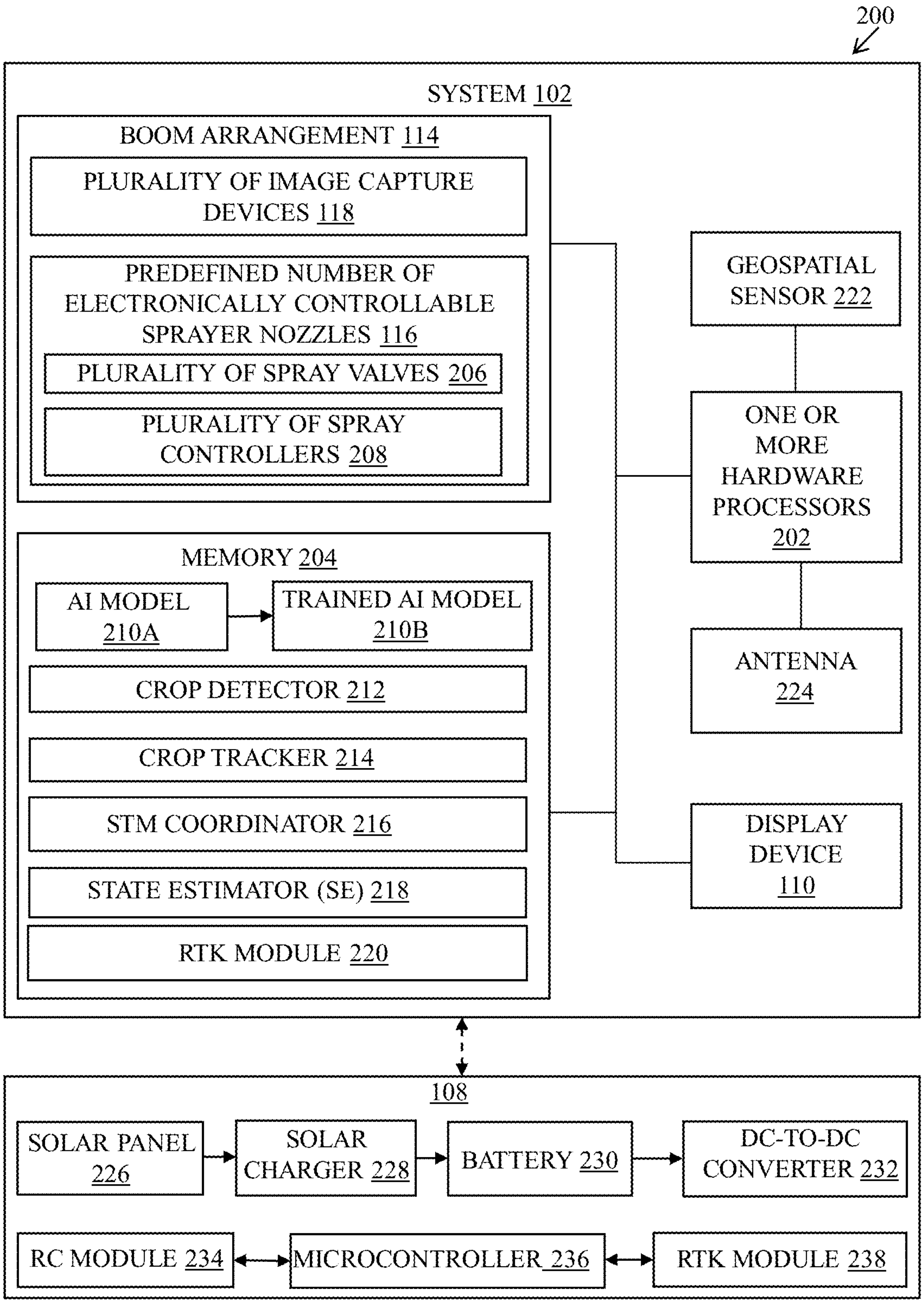
FIG. 2A is a block diagram that illustrates various exemplary components of a system, in accordance with an embodiment of the present disclosure.

FIG. 2A is a block diagram that illustrates various exemplary components of a system, in accordance with an embodiment of the present disclosure. FIG. 2 is described in conjunction with elements of FIGS. 1A and 1B. With reference to FIG. 2, there is shown a block diagram 200 of the system 102 (of FIG. 1) comprising one or more hardware processors 202 and a memory 204 with an artificial intelligence (AI) model 210.

In an implementation, the one or more hardware processors 202 may include one or more graphics processing units (GPU) and a central processing unit (CPU). Examples of each of the one or more hardware processors 202 may include, but are not limited to an integrated circuit, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the one or more hardware processors 202 may refer to one or more individual processors, graphics processing devices, a processing unit that is part of a machine.

The memory 204 may include suitable logic, circuitry, and/or interfaces that is configured to store machine code and/or instructions executable by the one or more hardware processors 202. Examples of implementation of the memory 204 may include, but are not limited to, an Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 204 may store an operating system, such as a robot operating system (ROS) and/or a computer program product to operate the system 102. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

The AI model 210A is trained to obtain a trained AI model 210B. The training of the AI model 210A is described in detail, for example, in FIG. 2B. The trained AI model 210B enables the plurality of image-capture devices 118 to process high-quality images of the agricultural field 106 despite of variation in the environmental parameters (i.e., variation in sunlight due to either clouds or rain or shadow of a large object). Moreover, the trained AI model 210B enables the system 102 to clearly differentiate between two green looking objects (e.g., crop plants and weeds) with advanced features and results in performing controlled and perceptive operations, such as perceptive spot spraying of a chemical, when the system 102 is in operation. Alternatively stated, the trained AI model 210B enhances the accuracy and efficiency of the system 102. In an implementation, the trained AI model 210B may be stored in the memory 204. In another implementation, the trained AI model 210B may be disposed outside the memory 204 as a separate module or circuitry and communicatively coupled to the memory 204.

In accordance with an embodiment, there is a training phase for the AI model 210A to obtain the trained AI model 210B used in an operational phase of the system 102. The training phase of the AI model 210A, is described in detail, in FIG. 2B.

Training Phase of the AI Model 210A

Figure 2B:
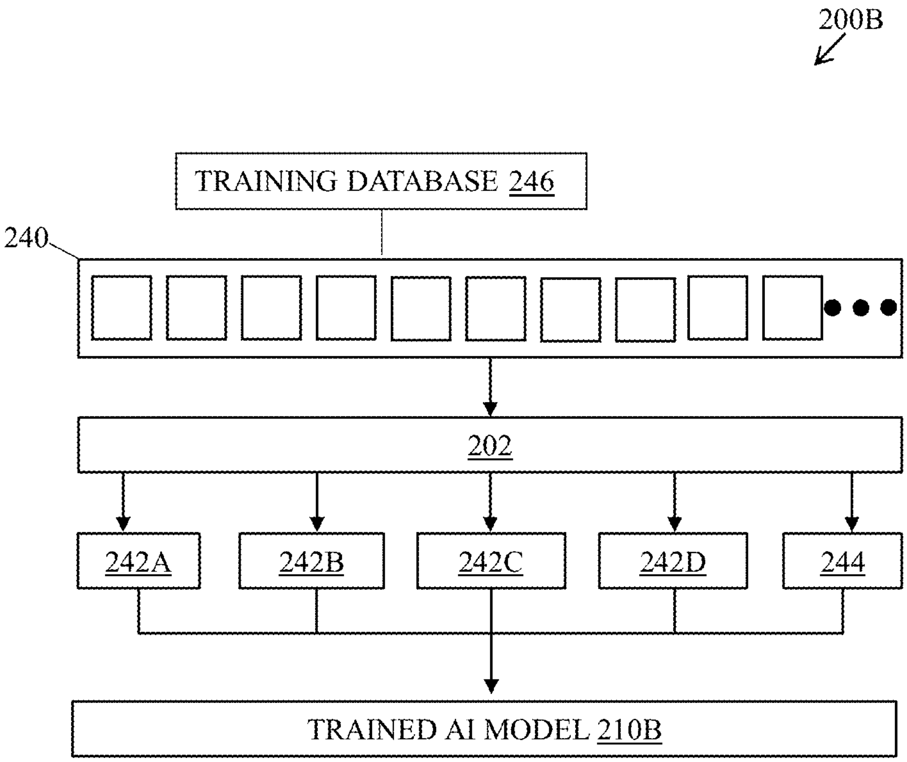
FIG. 2B is a block diagram that illustrates an exemplary training phase of an artificial intelligence (AI) model of a system, in accordance with an embodiment of the present disclosure.

Now referring to FIG. 2B, there is shown an exemplary scenario 200B of training of an AI model 210A to obtain a trained AI model 210B, in accordance with an embodiment of the present disclosure. In the training phase, the one or more hardware processors 202 are configured to obtain a training dataset 240 (i.e., training dataset of crop images) from the plurality of image-capture devices 118. The training dataset 240 used in the training phase may include thousands of different images of a crop plant (e.g., images of a cotton plant) that are captured with a holistic view of the crop plant from different geographical locations of a country so that variations in a same Genus and same species of a crop plant can be acquired for training purpose. For example, the one or more hardware processors 202 are configured to extract a location from metadata associated with the captured images. The location of the captured sequence of colour images is used to identify the local location of the agricultural field 106 that is further used to identify the climatic conditions and the soil conditions of the agricultural field 106 in the execution phase. For example, if the cotton plant is grown in a black soil, then, in such case, the cotton plant does not require any nutrient chemical spray. However, if the cotton plant is grown in any other soil, then, in such case, the cotton plant may require any nutrient chemical spray.

In accordance with an embodiment, the training dataset 240 are colour images of crop plants captured in actual real-world condition on the agricultural field 106 while the vehicle 104 is in motion. Furthermore, the training dataset 240 further comprises images that are captured at different times of day (e.g., early morning, evening, or night), and at different growth stages (e.g., two-day cotton plant, three-day cotton plant), different heath states (e.g., diseased and non-diseased etc.), and under different surrounding environmental conditions, with variation in sunlight due to either clouds, rain, a shadow of a large object, like tree, while capturing an image, change in position of sun throughout the day, different light intensity when farming is done etc.). In an implementation, such images are also captured when there is an external influence on the morphology of the crop plant, such as a change in shape of leaves and step when wind is blowing at different levels of speed, when leaves are drooping due to excess watering or lack of water etc. Thus, an extended set of training data (i.e., the training dataset 240) takes into account the different surrounding environmental conditions including variation in sunlight, the growth states, health state, external influence on the morphology of the crop plant, and drooping leaves, for the training of the AI model 210A.

In accordance with an embodiment, the one or more hardware processors 202 are configured to extract a plurality of different features from the training dataset 240 using the AI model 210A. In an implementation, the AI model 210A selected may be a deep neural network model, such as a convolution neural network (CNN) model. The one or more hardware processors 202 are configured to extract a feature 242A indicative of a type of the crop plant 240A, such as a cotton plant, a chilly plant, and the like. The one or more hardware processors 202 are further configured to extract a drooping leaf feature 242B from the training dataset 240 (i.e., the training dataset of images) stored in a training database 246. The drooping leaf feature is indicative of one or more structural patterns visible in images of crop plants with drooping leaves. In an example, the one or more structural patterns may be a leaf shape, an orientation with respect to stem, a texture, a colour etc. Thus, the drooping leaf feature may include one or more sub-features of the one or more structural patterns. At the time of drooping, the stomata of leaves start to get closed which creates obstruction in the photosynthesis process which affects the health of the crop plant. The drooping of leaves occurs due to certain natural and artificial conditions. The natural conditions include abiotic stresses such as extreme high or low temperatures, drought, flood, salts, strong wind, insufficient sunlight etc. The artificial conditions include overwatering (supply of more water than required), underwatering (supply of lesser water than required), supply of contaminated water etc. Because of drooping, the texture and pattern of leaves get disturbed and may resemble close to that of weeds. Thus, from images received through the image-capturing devices 118, the AI model 210A is trained to classify the images in which there is drooping condition of leaves has occurred.

In accordance with an embodiment, the one or more hardware processors 202 are further configured to extract one or more leaf movement features 242C from the training dataset. In certain scenarios, for example, due to movement of air, the natural structure of the leaves and the stem becomes temporarily disturbed. For example, depending on the intensity or force of air blowing on the crop plants, structure of the crop plants gets disturbed due to loss of turgidity of leaves. Moreover, there is possibility of overlapping of leaves due to impact from aerodynamic force. Due to overlapping, the leaves get constricted and the gap between the leaves get reduced. The extend of leaf movement due to wind also varies with respect to the time of the day and season. For example, the movement of the leaves in winds of rainy season is more rapid than that of summer season at the same time of the day etc. Thus, the images stored in the training dataset 240 fed to the AI model 210A while training include the images captured and labelled at a specified range of wind speed during specified time of the day (which depends on the region and geography of the location at which the crop plants are situated i.e., maximum wind speed of the region etc.). For example, one image is taken at 12 pm when the wind speed is 5 m/s which may be a typical maximum speed of wind at a given geographical region). Thus, the plurality of features extracted are interrelated and synergistic in nature, which works in sync to enhance the training effectiveness of the AI model 210A. The one or more hardware processors 202 are further configured to extract one or more stem bending features 242D from the training dataset 240. Like the leaves, the depending on the type of plant, and its inherent strength, the stem may also bend temporary when there is strong movement of air (e.g., strong wind). The AI model 210A further takes into account the stem bending in its training. In an example, the angle of bending of the stem depends on the speed of the wind. The images of crop plants in which stem is bent at different angles due to the wind speed are captured and stored in the training dataset 240. The advantage of extracting the stem bending feature of the crop plants is that the crop plants which are bent due to wind are not precepted as weed by the AI model 210A and are not excluded from receiving a supply of sprayed chemical in the operational or execution phase.

In accordance with an embodiment, furthermore, the one or more hardware processors 202 are further configured to extract a plurality of other features 244 of a crop plant at different growth stages and at different times-of-day with and without surrounding weeds, where the plurality of other features are indicative of physical characteristics of the crop plant at the different growth stages at the different times-of-day. In an implementation, the plurality of other features 244 comprises an age and growth state of the crop plant, a time of capture of the image, a weed pattern, a canopy pattern, a crown pattern, and the like. In an example, a sub-feature of an overall appearance of the type of crop plant may be indicative of an age and growth state of the crop plant (e.g., fifteen days cotton plant, 30 days, and the like). In an example, the age and growth state of the crop plant may be useful to decide which chemical to be selected for spraying and what shall be an ideal amount during the execution or operational phase of the system 102. In another example, the age of the crop plant may be useful to identify if the crop plant is eligible for tolerating a certain chemical spray or not, for example, the fifteen-day cotton plant may die due to the spray of a fungicide in the execution phase once the AI model 210A is trained. Thus, the fungicide may not be sprayed over the fifteen-day cotton plant. Further, during the training, the AI model 210A extracts one or more features of a crop plant at different growth stages and at different times of day with or without surrounding weeds from the training dataset 240. The growth stages of crop plants typically include meristematic, elongation and maturation phase. During the meristematic phase, the tips of roots and shoots of the crop plant exhibits continuous growth. In the elongation phase the cells of the plant gets expanded and in maturation phase, full grown plant with roots is formed. The reason for considering stages of growth of the crop plant to enable the AI model 210A to detect the crop plants which are in their intermediate stage of growth while spraying the chemicals. The stage of growth is important by two ways—firstly, to determine the quantity of chemical to be sprayed on the crop plant. i.e., the crop plant which is at the intermediate growth stage require different quantity of chemical than that of full-grown plant and secondly, to distinguish between the crop plant and the weed without having incorrect perception due to similarity of physical characteristics between the short-grown crop plant and the weed while determining the time and quantity of chemical to be sprayed. For example, at the meristematic phase, the size of the crop plant is lesser and equivalent to that of a weed. Therefore, the training dataset 240 is fed with images that include the details of growth stages of the crop plants at different times of the day. The features related to the growth stages of the crop plant are physical characteristics of the crop plant at the different growth stages at the different times-of-day. The physical characteristics include size, shape, colour, texture etc. of the leaves of the crop plant. These characteristics vary at different stages of growth. The advantage of considering the physical characteristics of the crop plant is to eliminate the perception error by the trained AI model 210B while distinguishing between the crop plant and the weed.

In accordance with an embodiment, the one or more hardware processors 202 are configured to timestamp the captured images indicative of the time of capture (i.e., or a time of day). The colour displayed in the captured images may vary due to the rain, shadow, sunlight or any other such environmental surroundings. Thus, the time of capture improves the perceptive ability in the execution phase to distinguish between the actual colour of the crop plant and any colour which is not natural and may be likely due to external environmental conditions, such as shadow, cloud, rain, time of day etc. The one or more hardware processors

202 are further configured to extract the weed pattern from the training dataset 240 indicative of a weed density around a crop plant. In certain scenarios, due to high weed density, the leaves of the weeds occlude the leaves of the identified crop plant. Therefore, during the training of the AI model 210A, an area covered by the crop plant and the weeds surrounding is also taken into account to prevent false detection of the crop plant, such as due to occlusion of the leaves of the crop plant by the weeds in the execution phase.

In accordance with an embodiment, the AI model 210A is trained using the plurality of different features extracted from the training dataset 240 to obtain a trained AI model 210B. It is to be understood that for different type of crops, such as cotton, chilli, tomato, such features are different, and thus, based on the type of crop plant different sets of parameters are loaded for training. In an implementation, different AI models maybe trained for different types of crop plants. In another implementation, same AI model 210A is trained for the crop specific parameters extracted from the training dataset 240. The trained AI model 210B may then be used by the one or more hardware processors 202 to detect and track the crop plant with high accuracy and distinguish from the weeds with an improved reliability.

Operational Phase or Execution Phase of the Trained AI Model 210B

Now referring back to the FIG. 2A, in the operational phase (also referred to as the execution phase), the system 102 with the trained AI model 210B is mounted in the vehicle 104 for performing controlled and perceptive operations, for example, improved and highly perceptive spot chemical spraying, on the agricultural field 106. The system 102 comprises the plurality of image-capture devices 118 configured to capture a plurality of field-of-views (FOVs) of a plurality of defined areas of the agricultural field 106 in a real-time or near real-time. When the vehicle 104 is moving across the agricultural field 106, the system 102 is configured to spray the chemicals on the agricultural field 106, in an intelligent way as well as in a controlled manner. The plurality of image-capture devices 118 enables the system 102 to monitor desired crop plants including a type of crop plants as well as the weeds in nearby surroundings of the desired crop plants in the agricultural field 106. The plurality of FOVs of the plurality of defined areas represents different views (e.g., a look-down view in a specified angle, for example, 45 degree to 90-degree angle) of the areas of the agricultural field 106 that includes the crop plants as well as the weeds. Each of the plurality of image-capture devices 118 captures the plurality of FOVs of the plurality of defined areas of the agricultural field 106 in order to provide one or more images (i.e., a sequence of images) of the crop plants (e.g., cotton plants) and the weeds with high details and information. In an implementation, each of the plurality of image-capture devices 118 may be oriented at a specific angle (e.g., 60°) in order to capture the plurality of defined areas of the agricultural field 106, few metres in forward as well as in downward direction, for example, up to 80-90 cm or up to 1 metre. This further leads to an effective chemical spraying in the agricultural field 106.

The system 102 further comprises the boom arrangement 114 that comprises the predefined number of electronically controllable sprayer nozzles 116. The predefined number of electronically controllable sprayer nozzles 116 are electronically controlled by use of solenoid valves which control the flow (e.g., on, off, pressure and volume) of chemicals through the sprayer nozzles. In an implementation, the predefined number of electronically controllable sprayer nozzles 116 of the boom arrangement 114 may be divided into a first set, a second set and a third set in order to spray chemicals on left side, right side, and in front side of the vehicle 104, respectively, when the vehicle 104 is moving across the agricultural field 106. Moreover, there may be a specific distance (e.g., 25 cm) between the plurality of image-capture devices 118 and the predefined number of electronically controllable sprayer nozzles 116 of the boom arrangement 114. The specific distance can be increased (e.g., increased up to 50 cm) by tilting each of the plurality of image-capture devices 118. The calibration of the specific distance between the plurality of image-capture devices 118 and the predefined number of electronically controllable sprayer nozzles 116 of the boom arrangement 114 provides a certain time for image processing and switch on the sprayer nozzles. The predefined number of electronically controllable sprayer nozzles 116 may be placed below the plurality of image-capture devices 118 in order to reduce delay and less time will be consumed in spraying the chemicals. In conventional agricultural systems, it is required to tilt a boom, rotate the boom, retract or fold up a part of the boom, when in operation etc. In contrast to the conventional agricultural systems, there is no such requirement in the boom arrangement 114 of the system 102. The predefined number of electronically controllable sprayer nozzles 116 further includes a plurality of spray valves 206 and a plurality of spray controllers 208 (e.g., a solenoid). Moreover, each spray valve from the plurality of spray valves 206 is attached to a corresponding sprayer nozzle of the predefined number of electronically controllable sprayer nozzles 116. Further, the one or more hardware processors 202 are configured to send an instruction (e.g., an electrical signal) at a first time instant to at least one spray controller (e.g., a solenoid) from the plurality of spray controllers 208 to activate or deactivate a specific set of spray valves associated with the identified sprayer nozzles.

The system 102 further comprises the one or more hardware processors 202 configured to obtain a sequence of images corresponding to the plurality of FOVs from the plurality of image-capture devices 118. In an implementation, the plurality of images captured by the plurality of image-capture devices 118 may include one or more images of the agricultural field 106 captured in different environmental conditions, such as a few images are captured in daylight, a few images are captured in evening time, and few are in night-time. Moreover, the plurality of images also includes one or more images captured during cloudy or rainy environment. In an implementation, the plurality of images captured by the plurality of image-capture devices 118 are stored in the memory 204. In an example, the plurality of images are further processed by a crop detector 212, and a crop tracker 214. The crop detector 212 is configured to detect a crop plant, using the trained AI model 210B which further leads to more accurate differentiation between crop plants and weeds in different environmental conditions and enables the boom arrangement 114 of the system 102 to perform an efficient and effective chemical spraying in the agricultural field 106. Moreover, the crop tracker 214 using the trained AI model 210B, is also configured to track location of each crop from the captured plurality of images. In an example, the crop detector 212 and the crop tracker 214 can be implemented in a hardware circuitry. In another example, the crop detector 212 and the crop tracker 214 may be implemented as functions or logic stored in the memory 204.

Figure 2C:
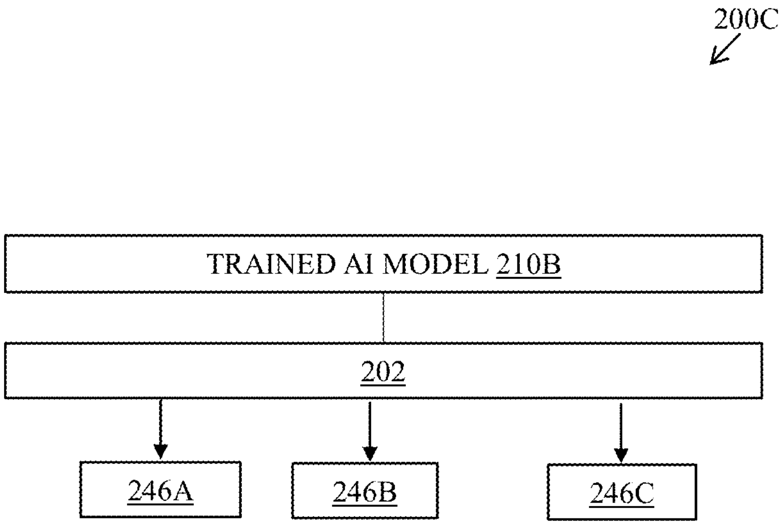
FIG. 2C is a block diagram that illustrates an exemplary operational phase of a trained AI model of a system for accurate distinguishing of the crop plants from weeds, in accordance with an embodiment of the present disclosure.

With reference to FIG. 2A and FIG. 2C, the one or more hardware processors 202 are further configured to distinguish crop plants from weeds using the trained AI model

210B (also may be referred to as a pre-trained AI model) when the vehicle 104 is motion on the agricultural field 106. The distinguishing of the crop plants from weeds using the trained AI model 210B comprises detecting a first set of crop plant 246A with drooping leaves, detecting a second set of crop plants 246B manifesting an elastic change in physical characteristics of the second set of crop plants, and detecting a third set of remaining crop plants 246C different from the first set of crop plants 246A and the second set of the crop plants 246B. The first set of crop plants refers 246A to a definite quantity of the crop plants manifesting drooping leaves from among all crop plants. The drooping leaves are the leaves which are in a weakened condition that causes downward inclination of leaves towards the agricultural field 106. Thus, from the images received through the image-capturing devices 118, the trained AI model 210B segregates the images in which there is drooping condition of leaves has occurred. The reason for detecting drooping nature of leaves is to eliminate the possibility of the trained AI model 210B to wrongly recognize the crop plant with drooping leaves as a weed, which will exclude the crop plant exhibiting drooping of leaves from spraying of a selected chemical. The second set of crop plants 246B is a group of crop plants which are different from the first set of crop plants 246A, i.e., a group of crop plants in which the leaves are not drooped. The elastic change is the change in the physical characteristics of the crop plants which are temporary and can be restored after a certain period or after removal of external influence that causes the change. The physical characteristic of the crop plants (which are of elastic nature) is the angle of inclination of stem, orientation of leaves, overlapping of leaves due to wind etc. These physical characteristics change under the influence of external force and are restored when the force is removed. As of result of the trained AI model 210B, an accurate detection and tracking of crop plants which have undergone temporary (i.e., elastic) change is done, so that a crop plant is not missed and deprived of a desired chemical spray or even and a misidentification of a crop plant as weed is avoided. The third set of remaining crop plants 246C are detected which are different from the first set of crop plants 246A and the second set of the crop plants 246*b*. The crop plants included in the third set are neither having drooped leaves nor having any physical characteristics which are of elastic nature. For example, healthy plants, or other crop plants with different heath state may be detected and tracked. The use of the trained AI model 210B prevent misfiring of the wrong chemical at unintended spots in the agricultural field 106.

The one or more hardware processors 202 are further configured to cause a specific set of electronically controllable sprayer nozzles from amongst the predefined number of electronically controllable sprayer nozzles 116 to operate based on the distinguishing of the crop plants from the weeds, where the distinguished crop plants comprise the first set of crop plants 246A with drooping leaves, the second set of crop plants 246B manifesting the elastic change in physical characteristics, and the third set of remaining crop plants 246C. The specific set of electronically controllable sprayer nozzle are selected based on the different sets (first, second and third) of the crop plants over which the chemical is to be sprayed. In an implementation, the specific set of electronically controllable sprayer nozzles from amongst the predefined number of electronically controllable sprayer nozzles 116 can be operated either automatically by virtue of the one or more hardware processors 202 or manually, depending on requirement. The operation of the predefined number of electronically controllable sprayer nozzles 116 depends on an accurate and improved distinguishing between the crop plants and the weeds, which takes into account the crop plant with drooping leaves, the second set of crop plants manifesting the elastic change in physical characteristics, and the third set of remaining crop plants.

In an implementation, the memory 204 further includes a STM coordinator 216, a state estimator (SE) 218, and a real time kinematics (RTK) module 220. In an example, each of the STM coordinator 216, SE 218, and the RTK module can be implemented in a hardware circuitry or logic. The STM coordinator 216 is configured to coordinate between the crop detector 212, the crop tracker 214, and the AI model 210 to process the captured plurality of images. Moreover, the SE 218 works in coordination with the RTK module 238 that is configured to process positioning details of the crop plants and weeds from the captured images with improved accuracy. In an example, the SE 218 is configured to receive data related to position of the crop plants and the weeds from the RTK module 220. In addition, the SE 218 is configured to receive freewheel odometry values from the vehicle 104 and provide a fused odometry output that is published in the memory 204 and used by the crop tracker 214 to track positions of the crop plants and weeds.

The one or more hardware processors 202 are further configured to receive geospatial location correction data from the external device 108 placed at a fixed location in the agricultural field 106 and geospatial location coordinates associated with the boom arrangement 114 mounted on the vehicle 104. In an example, the geospatial location coordinates associated with the boom arrangement 114 are obtained based on a geospatial sensor 222 arranged in the boom arrangement, for example, on a printed circuit board (PCB) where the one or more hardware processors 202 are disposed. In an implementation, the external device 108 may also be referred to as a real-time kinematics global positioning system (RTKGPS) module. The external device 108 is configured to provide the geospatial location correction data that means exact location of the vehicle 104 with error correction data in the agricultural field 106 when the vehicle 104 is moving at a specific range of speed across the agricultural field 106. Moreover, the external device 108 provides the geospatial location coordinates of the boom arrangement 114 that is mounted on the vehicle 104. In conventional agricultural systems, a GPS module is located inside a vehicle which provides location data of the vehicle. It is observed during experimentation that by virtue of locating the GPS module inside the vehicle, there is error in location accuracy of the vehicle. In contrast to the conventional agricultural systems, the external device 108 provides not only the exact location but also the error correction data. Additionally, the external device 108 provides geospatial location coordinates of the boom arrangement 114 that mounts the plurality of image-capture devices 118, the predefined number of the electronically controllable sprayer nozzles 116, and the one or more hardware processors 202 so that there is no delay in processing of data with high location accuracy (e.g., accuracy in centimetres, cm) can be achieved.

In an implementation, the external device 108 is setup on a tripod. Moreover, the external device 108 includes a solar panel 226, a solar charger 228, a battery 230, a DC-to-DC converter 232, a Remote Control (RC) module 234, a microcontroller 236, and a RTK module 238. The solar panel 226 is configured to be removably and electrically coupled to the external device 108. The solar panel 226 is further configured to capture solar energy and convert into electric energy, which is further stored in the battery 230 that is electrically coupled to the solar panel 226. Thereafter, the DC-to-DC converter 232 is configured to convert an output of the battery 230 from one voltage level to another, such as to provide a desired voltage to the RC module 234. In an example, the RC module 234 is configured to work with a specified frequency, for example, a 2.4 Giga Hertz or at other frequency value without limiting the scope of the disclosure. In addition, the microcontroller 236 is communicatively coupled with the RC module 234 as well as with the RTK module 238, for example through a universal asynchronous receiver-transmitter (UART). The microcontroller 236 is configured to control the RC module 234 and the RTK module 238, such as to ensure that the system is within a desired from the external device 108. For example, the RC module 234 and the RTK module 238 are configured to receive from an antenna 224 of the system 102.

The one or more hardware processors 202 are further configured to execute mapping of pixel data of weeds or a crop plant in an image to distance information from a reference position of the boom arrangement 114 when the vehicle 104 is in motion. In contrast to conventional agricultural systems, the one or more hardware processors 202 of the system 102 are configured to map pixel level data of weeds or the crop plant in the image to distance information to achieve high accuracy. The distance information signifies the information about the location of weeds and the crop plant from the reference position of the boom arrangement 114 when the vehicle 104 is in motion. That means, how far and in which direction the weeds and the crop plant is located in the agricultural field 106 from the reference position of the boom arrangement 114. Each pixel of the image is mapped to the distance information in millimetres (mm), for example, 1 pixel to 3 mm on real ground, pixel per mm mapping is performed. The mapping of the image depends on a certain threshold value. If the threshold value is different then, mapping of the image will be different. In an implementation, a sub-pixel (or a virtual pixel) of each pixel of the image can be considered to achieve more accuracy.

In an example, in order to execute the mapping, each of the plurality of image-capture devices 118 positioned above the predefined number of electronically controllable sprayer nozzles 116, captures an image frame of the ground (i.e., the agricultural field) with crop plants and weeds. From this image frame, the one or more hardware processors 202 are configured to map each crop plants/weeds in a coordinate, where the location correction data (RTK GPS) provides geolocation of the image frame. Using the image frame and the geolocation, a precise geolocation of each crop plant and/or weeds can be determined upto a precision of +/−2.5 cm. Now that the predefined number of electronically controllable sprayer nozzles 116 may be "X" distance away from at least one of the plurality of image-capture devices 118. Thus, the system 102 waits until one or more electronically controllable sprayer nozzles reaches the geolocation or geocoordinates of the crop pant to initiate spraying of a defined chemical. The boom orientation sensor data, boom height data, and camera orientation data are fused with the image frame and the geolocation of the image frame to derive accurate coordinate of each crop plant and weeds to precisely and perceptively spray on each crop plant (or weed if so desired).

In an implementation, the one or more hardware processors 202 are further configured to cause the specific set of electronically controllable sprayer nozzles from amongst the predefined number of electronically controllable sprayer nozzles 116 to operate further based on a defined confidence threshold and the executed mapping of pixel data, where the defined confidence threshold is indicative of a detection sensitivity of the crop plant. In an implementation, the specific set of electronically controllable sprayer nozzles from amongst the predefined number of electronically controllable sprayer nozzles 116 can be operated either automatically by virtue of the one or more hardware processors 202 or manually, depending on requirement. The operation of the predefined number of electronically controllable sprayer nozzles 116 depends on the defined confidence threshold and the executed mapping of pixel data. The defined confidence threshold is the threshold value of the AI model 210A. The defined confidence threshold is adaptive in real time or can be set manually by use of a user interface (UI) of the custom application 112 via the display device 110 (of FIG. 1). In a case, if the defined confidence threshold increases, the detection sensitivity of the crop plant increases. By virtue of the defined confidence threshold, the system 102 itself detects whether a plant is suffering from a disease, discolouration, or not. The use of the defined confidence threshold is described in further detail, for example, in FIG. 4.

In accordance with an embodiment, the one or more hardware processors 202 are further configured to determine a height of a tallest crop plant from among a plurality of crop plants from a ground plane in the agricultural field 106 and set a boom height from the ground plane based on the determined height of the tallest crop plant. In an example, the system 102 further includes an ultraviolet sensor that is used by the plurality of image-capture devices 118 to determine the height of the crop plant from the ground level. The height of the tallest crop plant from among the plurality of crop plants is determined from the ground plane in the agricultural field 106. The reason of determining the height of the tallest crop plant from among the plurality of crop plants is to include each and every crop with a height lying in a range of smallest to the tallest crop plant. Furthermore, the one or more processors are configured to set the boom height of the boom arrangement 114 from the ground plane based on the determined height of the tallest crop plant.

In accordance with an embodiment, the one or more hardware processors 202 are further configured to determine an upcoming time slot to spray a chemical based on the executed mapping of the pixel data, the defined confidence threshold, and the set boom height. In an implementation, the upcoming time slot may be referred to as a time period (or a time window) which is required to spray the chemical either on the crop plant or on weeds based on the executed mapping of the pixel data, the defined confidence threshold, and the set boom height. For example, 500 to 800 milliseconds (msec) may be required to spray the chemical on the crop plant or on the weeds. The time period of 500 to 800 msec is referred to as the upcoming time slot. By use of the executed mapping of the pixel data, the defined confidence threshold, and the set boom height, the chemical is sprayed either on the crop plant or on weeds in a controlled amount as well. In an implementation, the chemical may be sprayed on the crop plant in order to either protect the crop plant from disease or to promote the growth of the crop plant. In another implementation, the chemical may be sprayed on the weeds for weed management.

In accordance with an embodiment, the determining of the upcoming time slot to spray the chemical is further based on a size of the crop plant occupied in a two-dimensional space in x and y coordinate direction. The determination of the upcoming time slot (or the time period) to spray the chemical the crop plant is based on the size of the crop plant in the two-dimensional space in the x and y coordinate direction. In an implementation, the x coordinate direction indicates the direction of motion of the vehicle 104 and y coordinate direction indicates the height of the crop plant.

In accordance with an embodiment, the one or more hardware processors 202 are further configured to determine one or more regions in the agricultural field 106 where to spray a chemical based on the executed mapping of pixel data and the defined confidence threshold. Currently, the operations of conventional agricultural systems is based on proper demarcation of an agricultural field. In other words, row identification and row-based processing forms an indispensable component of the conventional agricultural systems. Therefore, the conventional agricultural systems fail when used in the agricultural field where there is no proper demarcation of rows, like in India and many other countries. In contrast to the conventional agricultural systems, the system 102 is applicable on both that is, row based agricultural fields or non-row based agricultural fields. The one or more hardware processors 202 of the system 102 are configured to determine the one or more regions of the agricultural field 106 where to intelligently spray the chemical based on the executed mapping of pixel data and the defined confidence threshold.

In accordance with an embodiment, the specific set of electronically controllable sprayer nozzles from amongst the predefined number of electronically controllable sprayer nozzles 116 are caused to operate specifically at the determined one or more regions in the agricultural field 106 for a first time slot that corresponds to the determined upcoming time slot. After determination of the one or more regions (i.e., either row based or non-row based) in the agricultural field 106 where there is requirement to spray the chemical, the specific set of electronically controllable sprayer nozzles from amongst the predefined number of electronically controllable sprayer nozzles 116 are caused to operate for the first time slot that corresponds to the determined upcoming time slot (i.e., the time period). The specific set of electronically controllable sprayer nozzles may include either the first set or the second set or the third set in order to spray the chemicals either on the left side, or the right side, or in the front side of the vehicle 104, respectively, when the vehicle 104 is moving across the agricultural field 106. The operation of the specific set of the electronically controllable sprayer nozzles from amongst the predefined number of electronically controllable sprayer nozzles 116 is described in further detail, for example, in FIGS. 5A and 5B.

In accordance with an embodiment, the one or more hardware processors are further configured to control an amount of spray of a chemical for the first time slot from each of the specific set of electronically controllable sprayer nozzles by regulating an extent of opening of a valve associated with each of the specific set of electronically controllable sprayer nozzles. Since each of the specific set of electronically controllable sprayer nozzles is electronically controlled by use of the valve (e.g., solenoid valve) therefore, by regulating the extent of opening of the valve, the amount of spray of the chemical can be controlled for the first time slot.

In accordance with an embodiment, the one or more hardware processors 202 are further configured to communicate control signals to operate a plurality of different sets of electronically controlled sprayer nozzles at different time instants during a spray session. In order to regulate the operation of the predefined number of electronically controllable sprayer nozzles 116, the one or more hardware processors 202 are configured to communicate the control signals (e.g., clock signals) to operate the plurality of different sets of electronically controlled sprayer nozzles at different time instants during the spray session.

In accordance with an embodiment, the one or more hardware processors 202 are further configured to receive a user input, via the custom application 112 rendered on the display device 110, wherein the user input corresponds to a user-directed disablement, or an enablement of one or more electronically controllable nozzles to override an automatic activation and deactivation of the one or more electronically controllable nozzles during a spray session. In an implementation, when a user moves the vehicle 104 across the agricultural field 106 then, the user may provide the user input through the custom application 112 rendered on the display device 110. The display device 110 may be used in form of either a tablet or a smart phone which is installed on one side of the vehicle 104. The user provides the user input either for deactivating or activating the one or more electronically controllable nozzles to stop or operating, respectively, the one or more electronically controllable nozzles during the spray session. An implementation scenario of the user-directed disablement, or the enablement of one or more electronically controllable nozzles to override the automatic activation and deactivation of the one or more electronically controllable nozzles during the spray session is described in detail, for example, in FIG. 5B.

Thus, the system 102 enables an intelligent spraying of the chemicals in the agricultural field 106 and in the controlled manner. The use of the AI model 210A enables the plurality of image-capture devices 118 to capture high-quality images of the agricultural field 106 despite of variation in the environmental parameters (i.e., variation in sunlight due to either clouds or rain or shadow of a large object). Moreover, the AI model 210A enables the system 102 to clearly differentiate between two green looking objects (e.g., crop plants and weeds) and results in a controlled spraying of chemicals on the agricultural field 106. Additionally, the geospatial location correction data received from the external device 108 enables the system 102 to have an exact location of the vehicle 104 with error correction data even when the vehicle 104 is moving at a specific range of speed across the agricultural field 106. The geospatial location coordinates of the boom arrangement 114 provided by the external device 108 enables the system 102 to have a high location accuracy of the vehicle 104. Moreover, mapping of each image at the pixel level (or at the sub-pixel level) to the distance information enables the system 102 to have a more accurate location of the crop plants and weeds in the agricultural field 106 and the boom arrangement 114 so that an efficient spraying of chemicals can be achieved. Furthermore, using the specific set of electronically controllable sprayer nozzles from amongst the predefined number of electronically controllable sprayer nozzles 116 depending on the application scenario increases the efficiency and practical utility of the system 102.

Figure 3:
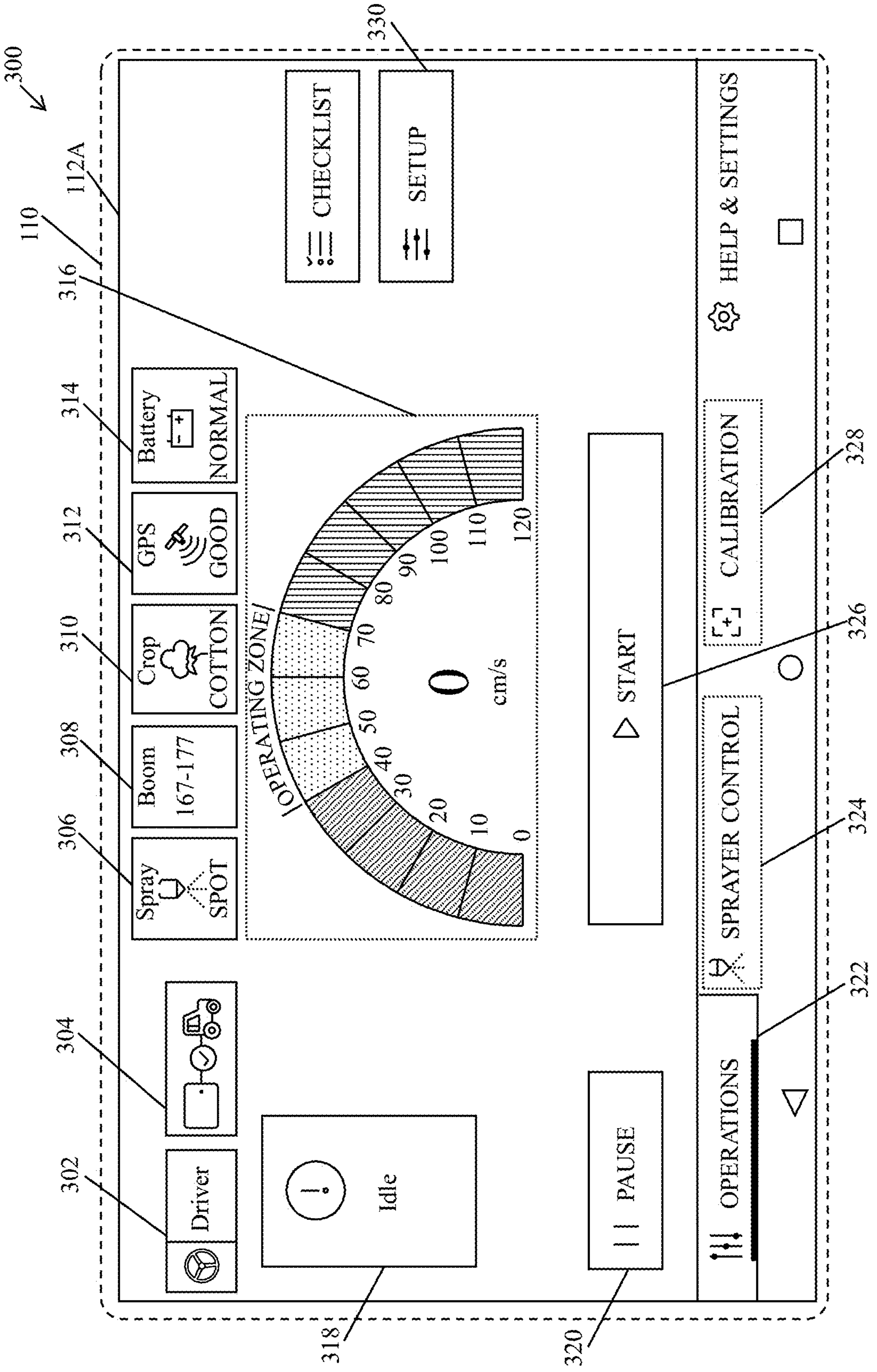
FIG. 3 is a diagram illustrating an exemplary scenario related to an operating zone of a system mounted in a vehicle, in accordance with an embodiment of the present disclosure.

FIG. 3 is an exemplary scenario that illustrates an operating zone of a system mounted in a vehicle, in accordance with an embodiment of the present disclosure. FIG. 3 is described in conjunction with elements from FIGS. 1A, 1B, and 2. With reference to FIG. 3, there is shown an exemplary scenario 300 that illustrates the operating zone of the vehicle 104 (of FIG. 1) via a UI 112A rendered on the display device 110. There is further shown different UI elements, such as UI elements 302 to 330, on the UI 112A.

In accordance with an embodiment, the specific set of electronically controllable sprayer nozzles are operated further based on a predefined operating zone (indicated by the UI element 316) of the vehicle 104, where the predefined operating zone (indicated by the UI element 316) defines a range of speed of the vehicle 104 in which an accuracy of the detection sensitivity of the crop plant is greater than a threshold. The predefined operating zone of the vehicle 104 means that when the vehicle 104 is moved through the agricultural field 106 in a specific range of speed, for example, from 40 to 70 cm/second (s), the accuracy of the detection sensitivity of the crop plant is greater than the threshold. Alternatively stated, the crop plant can be detected, tracked, identified with a crop type, and distinguished with weeds and any other green looking objects with improved accuracy in the predefined operating zone of the vehicle 104.

In an implementation, a custom application 112 is pre-installed in the display device 110. The custom application 112 has many user interfaces (UI), where the UI 112A is one of the many UI interfaces. The custom application 112 is designed and configured to directly establish a communication with a Robot Operating System (ROS) layer of the system 102 to perform any specified operations of the system 102.

The UI element 302 indicates a driver role and corresponding functions made available to a user operating the vehicle 104 as per the defined driver role. The UI element 304 indicates a connection status of the system 102. The UI element 306 indicates a spray modeselected as a perceptive spot spraying mode. The UI element 308 indicates a predetermined boom height range that is optimal for a tallest plant height determined by the system 102 as well a current boom height from the ground plane. The boom height range is determined for a given plant height based on experimentation where an optimal result was achieved previously and saved in a database for later use. The UI element 310 indicates a type of crop plant (such as a cotton plant in this case) that is current object-of-interest, to be acted on or sprayed with a specified chemical. The UI element 312 indicates a geospatial sensor signal quality (e.g., GPS signal quality) is good or not and also from the external device 108. The UI element 314 indicates battery status of the system 102 to power the components of the system 102. The UI element 318 indicates a current device activity status, i.e., whether the system 102 is in operation or idle. The UI element 320 indicates a pause or resume function in terms of operation of the system 102. The UI element 322 provides a control to visualize/update various operations and its corresponding settings or parameters. The UI element 324 is a sprayer control that provides an option to test and manually enable or disable some selected electronically controllable sprayer nozzles of the predefined number of electronically controllable sprayer nozzles 116. Such manual selection is sometimes needed to avoid double spraying of chemicals or under some unforeseen scenarios. An example is of such circumstance is explained in FIG. 5B. In an implementation, the predefined number of electronically controllable sprayer nozzles 116 may be segregated into different units, such as a first sprayer unit, a second sprayer unit, and a third sprayer unit. Each sprayer unit may include certain number of electronically controllable sprayer nozzles, for example, 5-10 or 8 electronically controllable sprayer nozzles. Moreover, each sprayer unit may be regulated and controlled by input received from one image-capture device of the plurality of image-capture devices 118. This segregation makes the processing very fast and avoids any unwanted delay or error in processing to accurately operate the system 102 for controlled and perceptive spraying of chemical as per need. The UI element 326 is a control to start or stop the system 102. When a user input that corresponds to the start of the system 102 is provided, all sensors and components of the system 102 are activated via commands shared with the ROS layer of the system 102. The UI element 328 is a control to check and run nozzle calibration before start of a spray session to make sure the predefined number of electronically controllable sprayer nozzles 116 are clean and ready to operate. Based on a user input (e.g., a touch input) on icon of each spray nozzle, it can be verified if the nozzle is operating as expected. The icon changes to indicate a correct functioning of the selected nozzle to the user while the user within the vehicle. The UI element 330 indicates an operations setup for a user-controlled spray mode selection, a crop selection, or a crop height verification or edit option, if needed in any situation.

Figure 4:
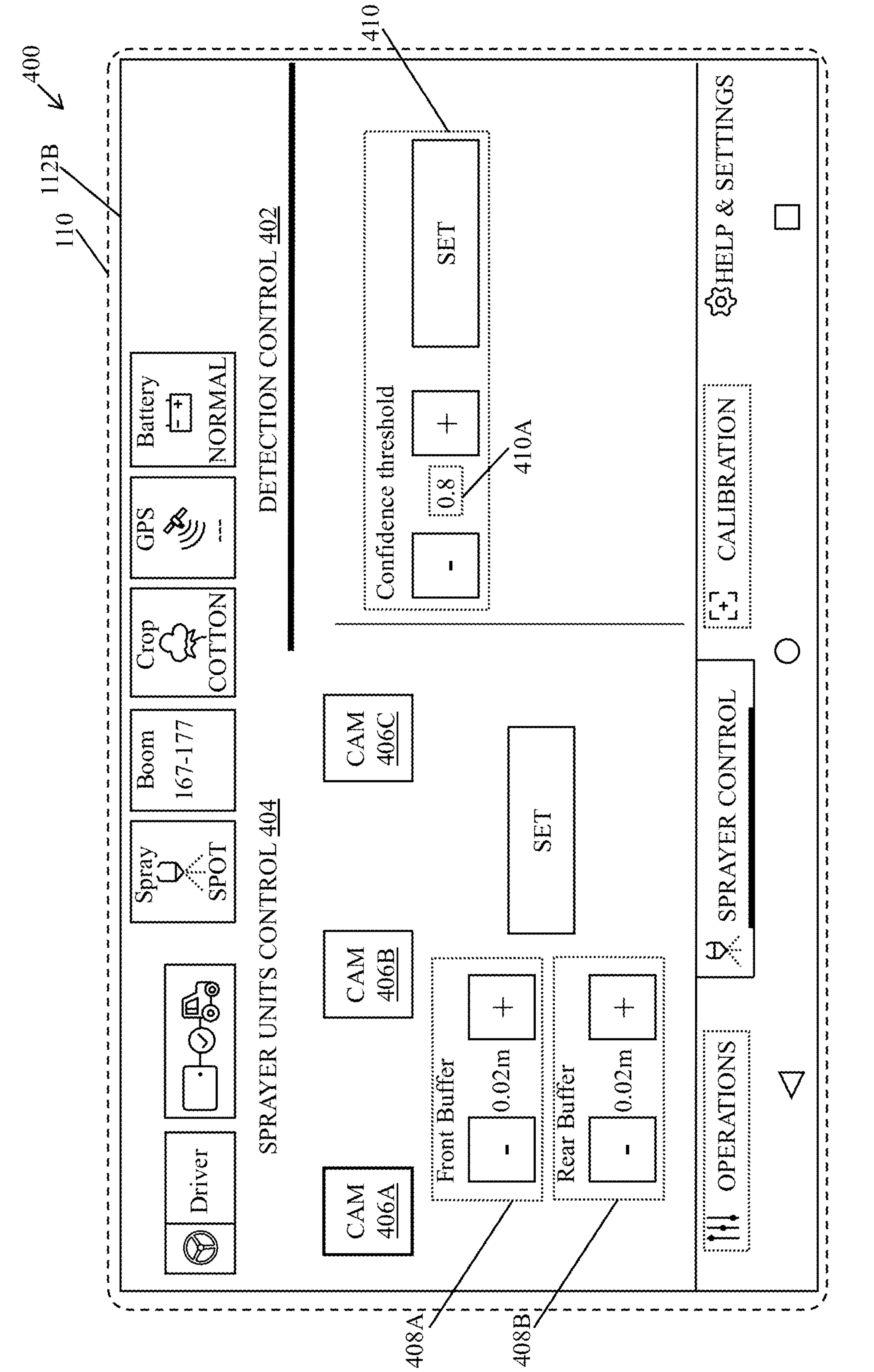
FIG. 4 is an exemplary scenario of setting a defined confidence threshold and camera buffers in a system, in accordance with an embodiment of the present disclosure.

FIG. 4 is an exemplary scenario of setting a defined confidence threshold and camera buffers, in accordance with an embodiment of the present disclosure. FIG. 4 is described in conjunction with elements from FIGS. 1A, 1B, 2, and 3. With reference to FIG. 4, there is shown an exemplary scenario 400 that illustrates setting of the defined confidence threshold 410A on the UI 112B rendered on the display device 110. There is further shown different UI elements, such as UI elements 402 to 410, on the UI 112B.

In an implementation, the defined confidence threshold 410A is set in real-time or near real-time in the AI model 210A of the system 102. Alternatively, the defined confidence threshold 410A is pre-set via the UI 112B rendered on the display device 110 communicatively coupled to the one or more hardware processors 202. In yet another implementation, the defined confidence threshold 410A is adaptive and may automatically be changed depending on a surrounding environment condition, a crop type, and/or a captured image input from the plurality of image-capture devices 118. Examples of the surrounding environmental conditions while capturing images of agricultural field may include, but are not limited to a variation in sunlight due to either clouds, rain, a shadow of a large object, like tree, in an image, a change in position of sun throughout the day, a change in light intensity, a time of day when farming is done etc, an extent of resistance from mud in the agricultural field 106.

In the exemplary scenario 400, the UI element 402 is a detection control that controls detection sensitivity of the crop plant by calibrating the defined confidence threshold 410A as indicated by the UI element 410. The defined confidence threshold 410A is automatically (or optionally manually) increased or decreased, depending on the requirement. If the defined confidence threshold 410A increases, detection sensitivity of the crop plant increases. The confidence threshold value may range from 0 to 1. An increase or decrease of the defined confidence threshold 410A increases, it changes i.e., increases or decreases the perceptiveness of the system 102. For example, at a first defined confidence threshold, say 0.X1, the one or more hardware processors 202 are configured to distinguish between green looking objects, such as crop plants and weeds. At a second defined confidence threshold, say 0.X2, the one or more hardware processors 202 are configured to further distinguish between a type of crop plant and a type of weed. At a third defined confidence threshold, say 0.X3, the one or more hardware processors 202 are configured to further distinguish between a diseased or a non-diseased crop plant and further distinguish weeds from such diseased or non-diseased crop plants. At a fourth defined confidence threshold, say 0.X4, the one or more hardware processors 202 are configured to further increase crop detection sensitivity such that a discoloured plant or non-discoloured plant, a growth state of the crop plant, a lack of nutrient etc. can be further sensed and additionally distinguish from weeds. Such detection sensitivity is very advantageous and provides a technical effect of increased perceptiveness of the system 102 resulting in improved performance of the system 102, such as reduced wastage of chemical used for spraying. At a fifth defined confidence threshold, say 0.X5, the one or more hardware processors 202 are configured to distinguish various crop plants from weeds using the trained AI model 210B by detecting the first set of crop plant 246A with drooping leaves, detecting the second set of crop plants 246B manifesting the elastic change in physical characteristics of the second set of crop plants, and also detecting the third set of remaining crop plants 246C different from the first set of crop plants 246A and the second set of the crop plants 246B. Alternatively state, the use of the defined confidence threshold 410A significantly improves the perceptive capability of the system 102 such that the spraying of chemicals is achieved with improved accuracy and precision for the correct time slots, at correct intended areas or spots and only when required with correct amount of spray and correct selection of a type of chemical irrespective of any change in the surrounding environmental conditions while capturing images of agricultural field. For example, an increase or a decrease in the defined confidence threshold 410A dynamically changes the detection sensitivity of the crop plant increasing the perceptive capability of the system 102 making the system fail-safe.

In an example, two different chemicals can be loaded in two different chemical storage chamber in the vehicle 104. A specific chemical type is used only when a discoloured crop plant is detected by a specific nozzle while some nozzles may use another chemical to spray on normal/healthy crop plant, and remaining nozzles may be deactivated to stop spraying on weeds or unwanted regions. Thus, different applications are made possible by calibration of the defined confidence threshold 410A.

In accordance with an embodiment, the one or more hardware processors 202 are configured to update the defined confidence threshold in response to a change in a quality parameter of the captured plurality of FOVs of the plurality of defined areas of the agricultural field 106. For example, when there is a change in the quality parameter of the captured plurality of FOVs, that means some images are captured in a sunny environment, a few images are captured in a cloudy environment and a few other images are captured in rainy environment or there is some shadow, then according to the change in the quality parameter, the defined confidence threshold 410A is dynamically updated to maintain the spray accuracy greater than a threshold, for example, greater than 95-99.99%.

In an example, the one or more hardware processors 202 are configured to determine precision and recall values for different confidence threshold values ranging from 0.1-0.99. The confidence threshold may be selected by identifying and selecting an optimal point in dataset of the precision and recall values that meets the required high recall and at the same time maintaining high enough precision values associated with the detection sensitivity of the AI model. When a precision value is highest, the recall value may be lowest. Thus, a right mix of precision and recall value is reflected in a given confidence threshold value.

In an implementation, the UI element 404 is a sprayer units' control where a front buffer 408A and a rear buffer 408B associated with each image-capture device indicated by UI elements 406A, 406B, and 406C, of the plurality of image-capture devices 118, may be set. Such setting may occur automatically by the one or more hardware processors 202 or may be done based on a user input. The one or more hardware processors 202 are further configured to determine one or more regions in the agricultural field 106 where to spray a chemical based on the executed mapping of pixel data, the defined confidence threshold 410A, and the front buffer 408A and the rear buffer 408B associated with each image-capture device of the plurality of image-capture devices 118. For example, if a region is determined as 15 cm length and 15 cm breadth. Thus, increasing the front buffer 408A to 5 cm may extend the spray region ahead of the crop plant by 5 cm, for example, now 20 cm length. Similarly, increasing the rear buffer 408B, say by 3 cm, may dynamically extend the spray area to 3 cm from the rear end/behind the crop plant in the direction of movement of the vehicle 104.

Figure 5A:
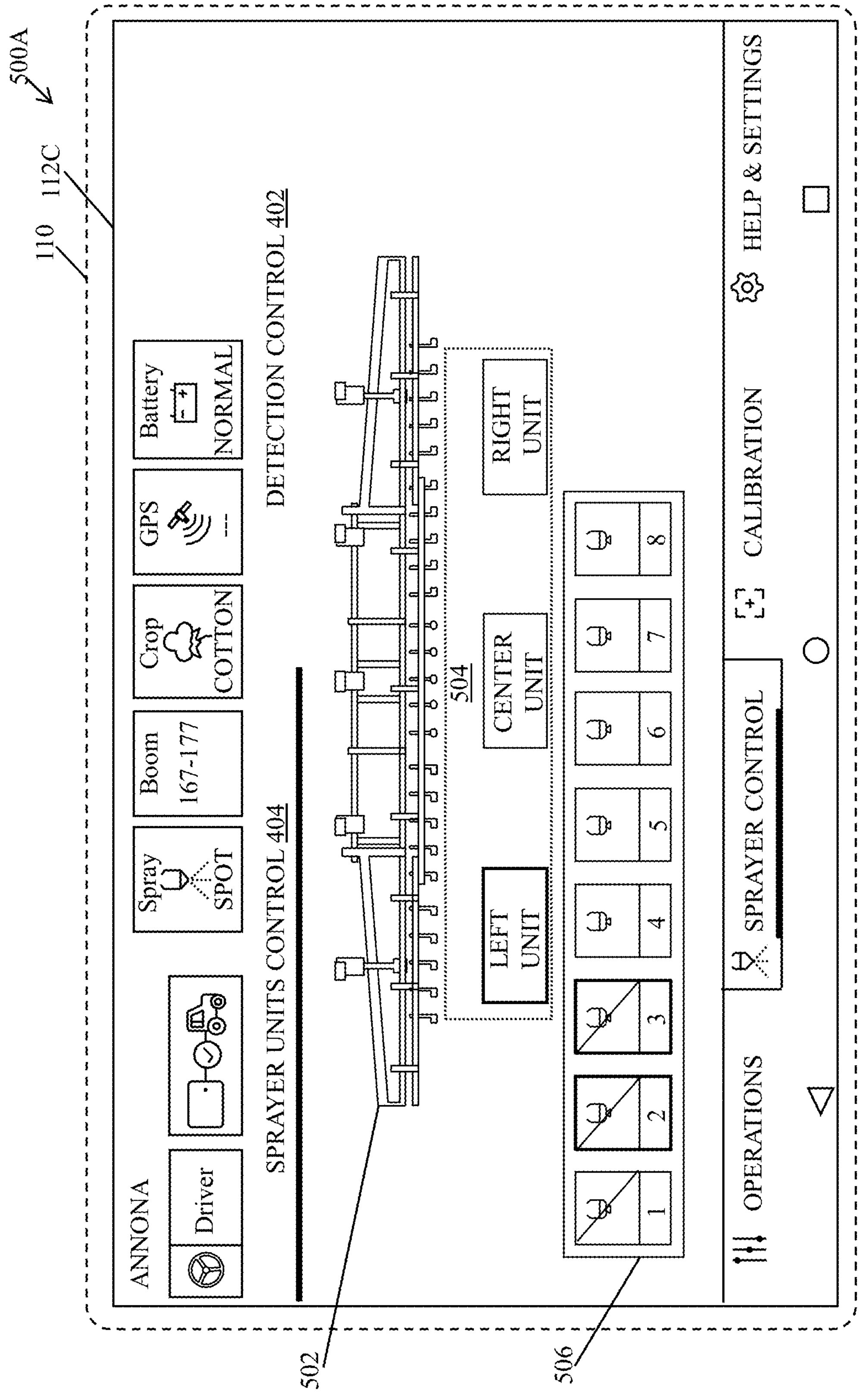
FIGS. 5A and 5B are diagrams collectively illustrating an exemplary scenario for implementation of the system and method for performing an agricultural application, in accordance with an embodiment of the present disclosure.
Figure 5B:
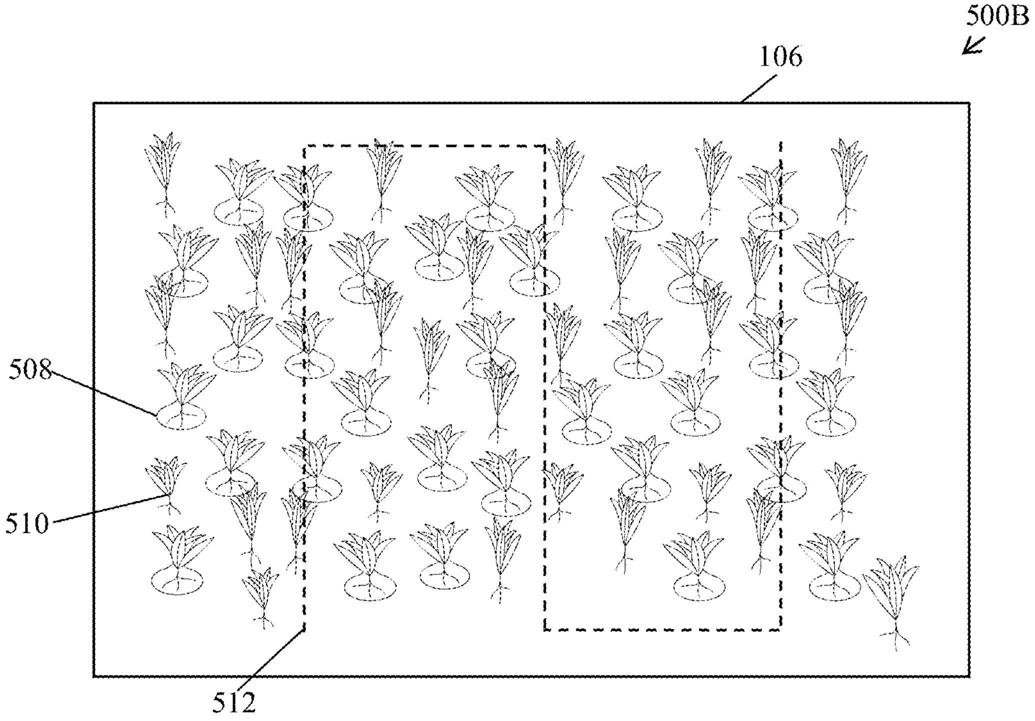

FIGS. 5A and 5B are diagrams collectively illustrating an exemplary scenario for implementation of the system and method for performing an agricultural application, in accordance with an embodiment of the present disclosure. FIG. 5A is described in conjunction with elements from FIGS. 1, 2, 3 and 4. With reference to FIG. 5A, there is shown an exemplary scenario 500A that illustrates the operating zone of the vehicle 104 (of FIG. 1) via a UI 112C rendered on the display device 110. There is further shown different UI elements, such as UI elements 502 to 506, on the UI 112C.

In the exemplary scenario 500A, the UI element 502 indicates position of the boom arrangement 114. The UI element 502 is used to control the predefined number of electronically controllable sprayer nozzles 116. The predefined number of electronically controllable sprayer nozzles 116 are divided into three units (represented by the UI element 504), for example, a left unit, a right unit, and a centre unit. There is further shown a selection of the left unit (represented by a thick box). Moreover, the UI element 506 indicates that the left unit includes a total of eight electronically controllable sprayer nozzles out of which first three sprayer nozzles are deactivated manually by use of the UI element 506. In another implementation scenario, the first three sprayer nozzles can be automatically deactivated by use of the trained AI model 210B. The deactivation of the first three sprayer nozzles is performed in order to perform the controlled and perceptive chemical spraying on the agricultural field 106, for example, not to spray again crop plants when the vehicle 104 moves in opposite direction to cover another set of crop plants, like shown, for example, in FIG. 5B.

With reference to FIG. 5B, there is shown an implementation scenario 500B that illustrates selection of the specific set of electronically controllable sprayer nozzles from amongst the predefined number of electronically controllable sprayer nozzles 116 of the boom arrangement 114. In the implementation scenario 500B, there is shown that the agricultural field 106 comprises a plurality of crop plants, such as a crop plant 508 (e.g., cotton plants) and a plurality of weeds, such as a weed 510. The plurality of crop plants and the plurality of weeds are grown unevenly in the agricultural field 106. A dotted path 512 illustrates the movement of the vehicle 104 across the agricultural field 106. As the implementation scenario 500B illustrates a specific area of the agricultural field 106, thus the dotted path 512 for the movement of the vehicle 104 can vary to cover full area of the agricultural field 106. The system 102 is configured to spray the chemicals on the plurality of crop plants only of the agricultural field 106. When the vehicle 104 starts moving across the agricultural field 106 in a first direction until edge of the portion of the agricultural field 106 is reached, some of the predefined number of electronically controlled sprayer nozzles 116 are activated automatically based on the predefined confidence threshold and the executed mapping of pixel data of crop plants and weeds from captured images. However, when the vehicle 104 takes its first turn and starts moving in a second direction (opposite direction) on the dotted path 512, then in such cases, a part of the boom arrangement 114 may cover some crop plants already sprayed previously by the system 102. In such situation, automatically spraying by the system 102 may cause the double spraying on such previously sprayed crop plants. Thus, the system 102 provides an option of manual deactivation of some electronically controlled sprayer nozzles, say of right unit, to override any automatic activation of manually deactivated electronically controlled sprayer nozzles when crop plants are detected and comes underneath such spray nozzles. Whereas remaining electronically controlled sprayer nozzles which are not manually deactivated continue to operate automatically to cover and spray chemical on other new crop pants while moving in that second direction.

Figure 6A:
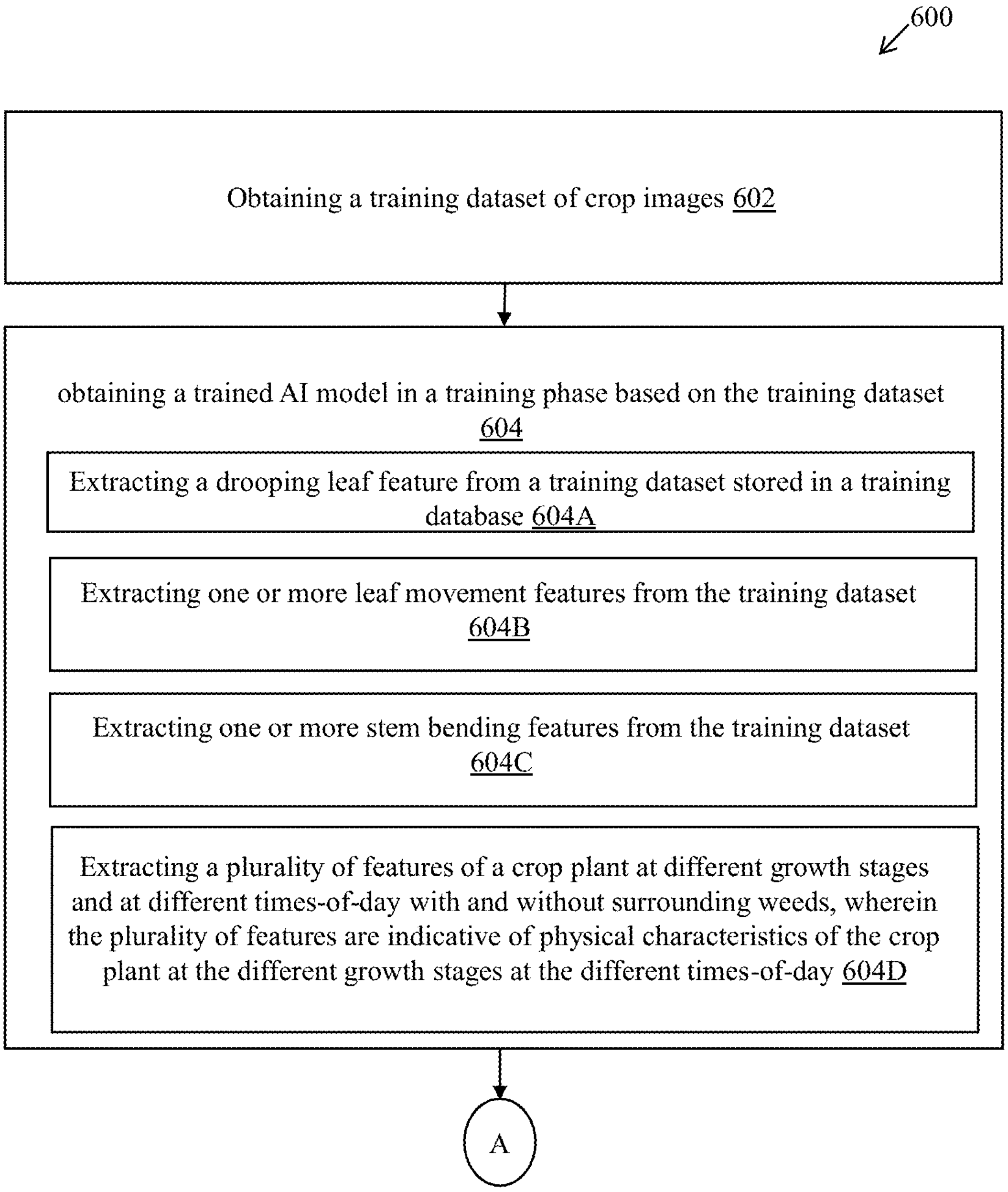
FIGS. 6A, 6B, and 6C collectively is a flowchart of a method of operation of the system, in accordance with an embodiment of the present disclosure.
Figure 6B:
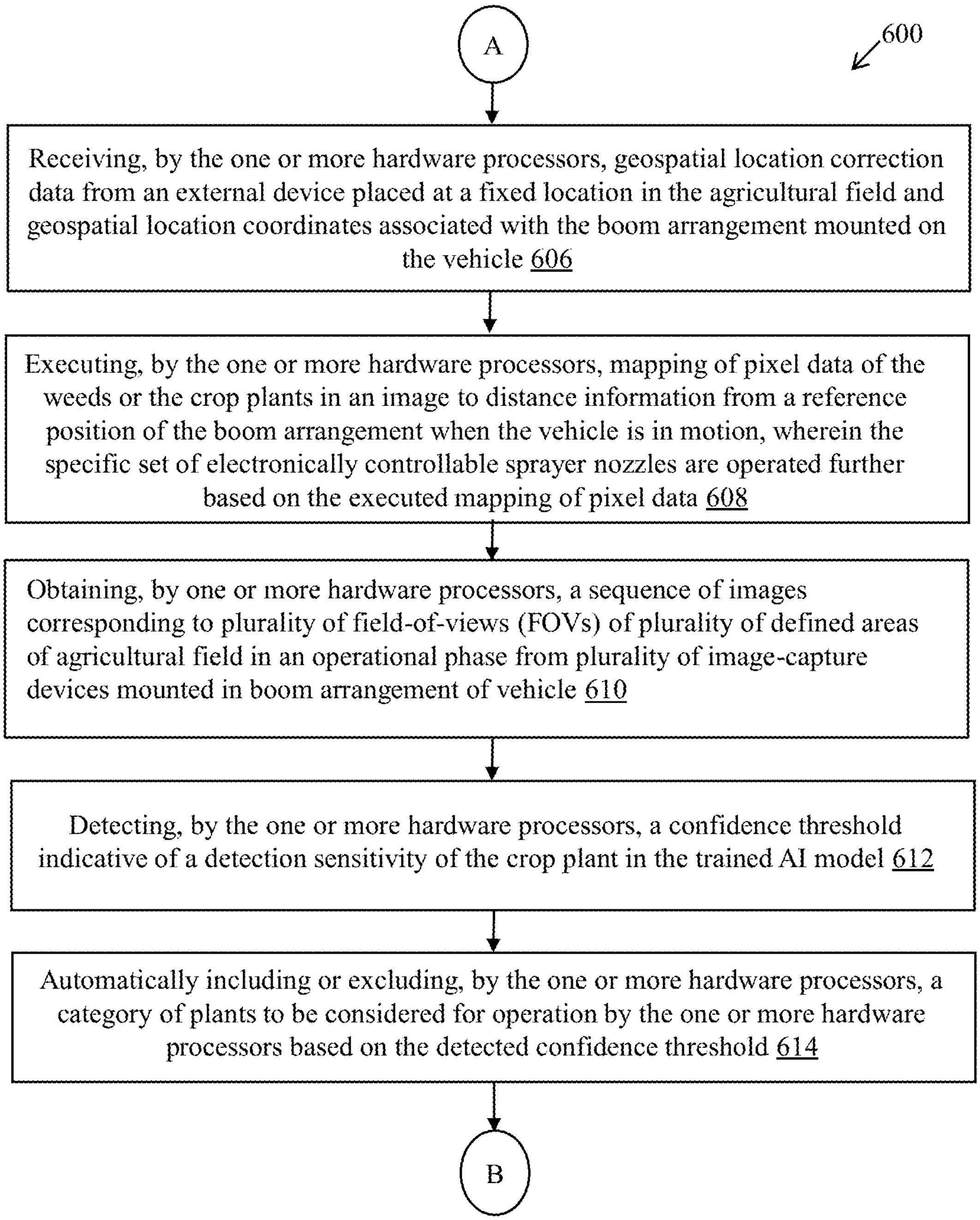
Figure 6C:
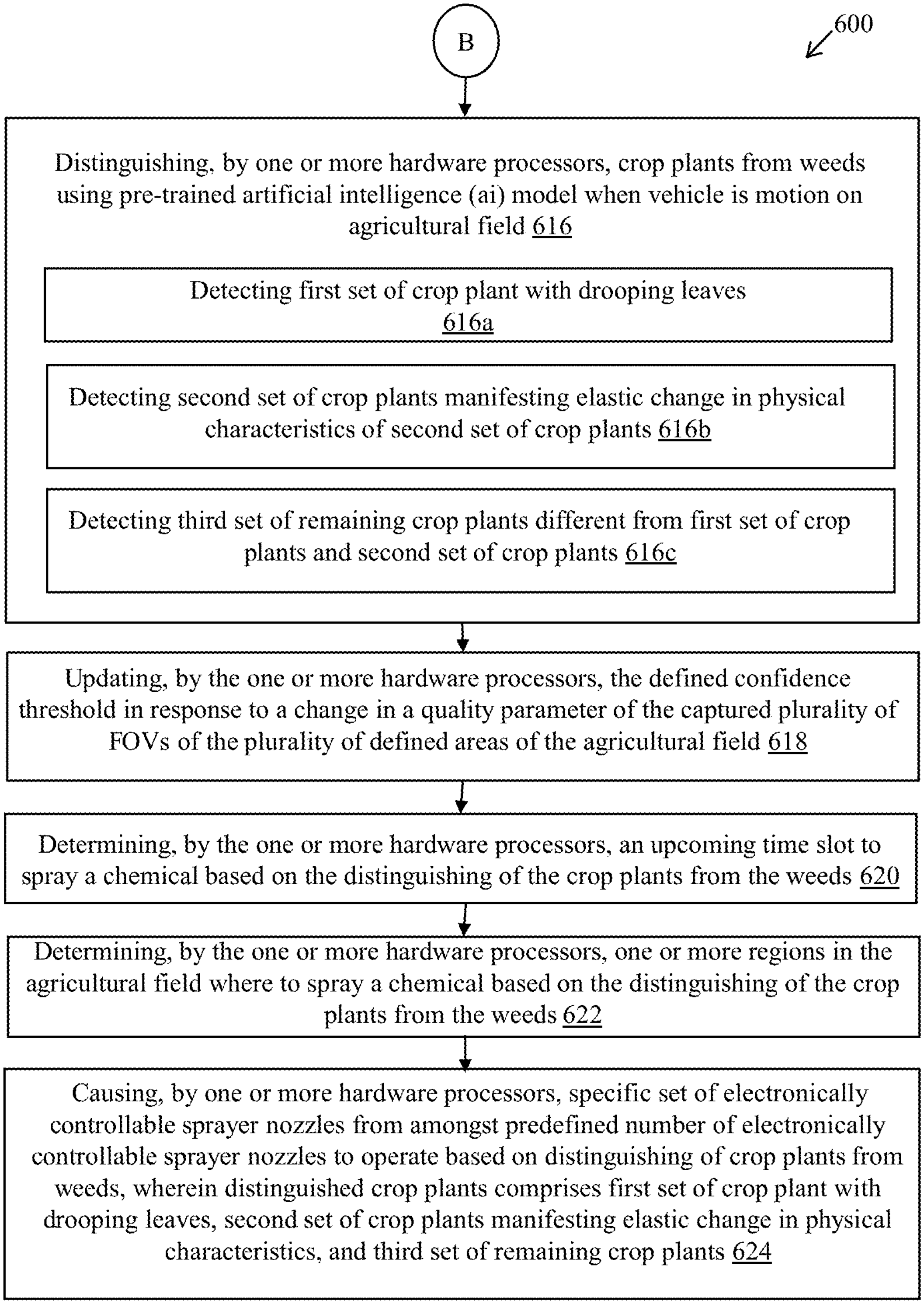

FIGS. 6A, 6B, 6C collectively is a flowchart of a method of operation of a system, in accordance with an embodiment of the present disclosure. FIGS. 6A, 6B, and 6C are described in conjunction with elements from FIGS. 1, 2A, 2B, 2C, 3, 4, 5A and 5B. With reference to FIGS. 6A, 6B and 6C, there is shown a method 600 for use in the vehicle 104 (of FIG. 1) for operation of the system 102. The method 600 includes operations 602 to 624. The method 600 is executed by the one or more hardware processors 202 of the system 102 (of FIG. 1).

At 602, the method 600 comprises obtaining a training dataset of crop images. The training dataset may be obtained from a training database that stores previously captured images from by plurality of image-capture devices 118.

At 604, the method 600 comprises training an AI model 210A to obtain a trained AI model 210B in a training phase based on the training dataset. The operation 604 comprises multiple sub-operations, such as operations 604A, 604B, and 604C. At 604A, the method 600 comprises extracting a drooping leaf feature from the training dataset stored in the training database. At 604B, the method 600 comprises extracting one or more leaf movement features from the training dataset. At 604C, the method 600 comprises extracting one or more stem bending features from the training dataset. At 604D, the method 600 comprises extracting a plurality of features of a crop plant at different growth stages and at different times-of-day with and without surrounding weeds, wherein the plurality of features are indicative of physical characteristics of the crop plant at the different growth stages at the different times-of-day.

At 606, the method 600 comprises receiving, by the one or more hardware processors 202, geospatial location correction data from an external device 108 placed at a fixed location in the agricultural field 106 and geospatial location coordinates associated with the boom arrangement 114 mounted on the vehicle 104.

At 608, the method 600 comprises executing, by the one or more hardware processors 202, mapping of pixel data of the weeds or the crop plants in an image to distance information from a reference position of the boom arrangement 114 when the vehicle 104 is in motion, wherein the specific set of electronically controllable sprayer nozzles are operated further based on the executed mapping of pixel data.

At 610, the method 600 comprises obtaining, by the one or more hardware processors 202, a plurality of images corresponding to a plurality of field-of-views (FOVs) of a plurality of defined areas of the agricultural field 106 from the plurality of image-capture devices 118 mounted in a boom arrangement of a vehicle.

At 612, the method 600 comprises detecting, by the one or more hardware processors 202, a confidence threshold indicative of a detection sensitivity of the crop plant in the trained AI model 210B.

At 614, the method 600 comprises automatically including or excluding, by the one or more hardware processors 202, a category of plants to be considered for operation by the one or more hardware processors 202 based on the detected confidence threshold.

At 616, the method 600 further comprises distinguishing, by the one or more hardware processors 202, crop plants from weeds using a trained AI model 210B when the vehicle 104 is motion on the agricultural field 106. Moreover, the distinguishing of the crop plants from weeds using the trained AI model 210B comprises sub-operations, such as operations 616*a* to 616*c*. At 616*a*, the distinguishing of the crop plants from weeds using the trained AI model 210B comprises detecting the first set of crop plant 246A with drooping leaves. At 616*b*, the distinguishing of the crop plants from weeds using the trained AI model 210B further comprises detecting the second set of crop plants 246B manifesting an elastic change in physical characteristics of the second set of crop plants 246B. At 616*c*, the distinguishing of the crop plants from weeds using the trained AI model 210B further comprises detecting the third set of remaining crop plants 246C different from the first set of crop plants 246A and the second set of the crop plants 246B.

At 618, the method 600 further comprises updating, by the one or more hardware processors 202, the defined confidence threshold in response to a change in a quality parameter of the captured plurality of FOVs of the plurality of defined areas of the agricultural field 106.

At 620, the method 600 further comprises determining, by the one or more hardware processors 202, an upcoming time slot to spray a chemical based on the distinguishing of the crop plants from the weeds. The determining of the upcoming time slot to spray the chemical may be further based on a size of the crop plant occupied in a two-dimensional space in x and y coordinate direction.

At 622, the method 600 further comprises determining, by the one or more hardware processors 202, one or more regions in the agricultural field where to spray a chemical based on the distinguishing of the crop plants from the weeds. Thereafter, the one or more hardware processors 202 may communicate control signals to operate a plurality of different sets of electronically controlled sprayer nozzles at different time instants during a spray session based on the distinguishing of the crop plants from the weeds.

At 624, the method 600 further comprises causing, by the one or more hardware processors 202, a specific set of electronically controllable sprayer nozzles from amongst the predefined number of electronically controllable sprayer nozzles 116 to operate based on the distinguishing of the crop plants from the weeds, wherein the distinguished crop plants comprises the first set of crop plant 246A with drooping leaves, the second set of crop plants 246B manifesting the elastic change in physical characteristics, and the third set of remaining crop plants 246C.

The method 600 is used for detecting crop plants with advanced technology where even if there are some temporary or elastic changes in morphology of the crop plants, for example, drooping leaves, any elastic change in the physical characteristics like from movement of air across the crop plants, or a change in shape of leaves due to some external conditions, the detection of such crop plants is not missed. The distinguishing of the crop plants from the weeds using the trained AI model 210B is used to accurately identify the crop plants with more than 98-100% accuracy in the uneven agricultural land even if there is any change in surrounding environmental conditions, such as change in shape of leaves due to wind, drooping of leaves, occlusion by weed, high weed density around the crop plants, and the like. This improves the perceptive ability to adapt to uneven agricultural land and handle surprisingly advanced real-time changes in the surrounding environmental conditions.

The operations 602 to 624 are only illustrative and other alternatives can also be provided where one or more steps are added, one or more steps are removed, or one or more steps are provided in a different sequence without departing from the scope of the claims herein. Various embodiments and variants disclosed with the aforementioned system (such as the system 102) apply mutatis mutandis to the aforementioned method 600.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system mounted in a vehicle, the system comprising:

a boom arrangement that comprises a predefined number of electronically controllable sprayer nozzles and a plurality of image-capture devices configured to capture a plurality of field-of-views (FOVs) of a plurality of defined areas of an agricultural field; and one or more hardware processors configured to:

obtain a sequence of images corresponding to the plurality of FOVs from the plurality of image-capture devices;

distinguish crop plants from weeds using a trained artificial intelligence (AI) model when the vehicle is motion on the agricultural field, wherein the distinguishing of the crop plants from weeds using the trained AI model comprises:

detecting a first set of crop plants with drooping leaves;

detecting a second set of crop plants manifesting an elastic change in physical characteristics of the second set of crop plants; and detecting a third set of remaining crop plants different from the first set of crop plants and the second set of crop plants, and cause a specific set of electronically controllable sprayer nozzles from amongst the predefined number of electronically controllable sprayer nozzles to operate based on the distinguishing of the crop plants from the weeds, wherein the distinguished crop plants comprise the first set of crop plants with drooping leaves, the second set of crop plants manifesting the elastic change in physical characteristics, and the third set of remaining crop plants, and wherein the trained AI model is obtained in a training phase by:

extracting a drooping leaf feature from a training dataset stored in a training database;

extracting one or more leaf movement features from the training dataset;

extracting one or more stem bending features from the training dataset; and extracting a plurality of features of a crop plant at different growth stages and at different times-of-day with and without surrounding weeds, wherein the plurality of features are indicative of physical characteristics of the crop plant at the different growth stages at the different times-of- day.

2. The system according to claim 1, wherein the one or more hardware processors are configured to receive geospatial location correction data from an external device placed at a fixed location in the agricultural field and geospatial location coordinates associated with the boom arrangement mounted on the vehicle.

3. The system according to claim 1, wherein the one or more hardware processors are configured to execute mapping of pixel data of the weeds or the crop plants in an image to distance information from a reference position of the boom arrangement when the vehicle is in motion, wherein the specific set of electronically controllable sprayer nozzles are operated further based on the executed mapping of pixel data.

4. The system according to claim 1, wherein the one or more hardware processors are configured to:

detect a confidence threshold indicative of a detection sensitivity of the crop plant in the trained AI model; and automatically include or exclude a category of plants to be considered for operation by the one or more hardware processors based on the detected confidence threshold.

5. The system according to claim 4, wherein the one or more hardware processors are configured to update the confidence threshold in response to a change in a quality parameter of the captured plurality of FOV s of the plurality of defined areas of the agricultural field.

6. The system according to claim 1, wherein the one or more hardware processors are further configured to determine an upcoming time slot to spray a chemical based on the distinguishing of the crop plants from the weeds.

7. The system according to claim 6, wherein the determining of the upcoming time slot to spray the chemical is further based on a size of the crop plant occupied in a two-dimensional space in x and y coordinate direction.

8. The system according to claim 1, wherein the one or more hardware processors are further configured to determine one or more regions in the agricultural field where to spray a chemical based on the distinguishing of the crop plants from the weeds.

9. The system according to claim 1, wherein the one or more hardware processors are further configured to communicate control signals to operate a plurality of different sets of electronically controlled sprayer nozzles at different time instants during a spray session based on the distinguishing of the crop plants from the weeds.

10. A method of operation of a system, the method comprises:

obtaining, by one or more hardware processors, a sequence of images corresponding to a plurality of field-of-views (FOV s) of a plurality of defined areas of an agricultural field from a plurality of image-capture devices mounted in a boom arrangement of a vehicle;

distinguishing, by the one or more hardware processors, crop plants from weeds using a trained artificial intelligence (AI) model when the vehicle is motion on the agricultural field, wherein the distinguishing of the crop plants from weeds using the trained AI model comprises:

detecting a first set of crop plants with drooping leaves;

detecting a second set of crop plants manifesting an elastic change in physical characteristics of the second set of crop plants; and detecting a third set of remaining crop plants different from the first set of crop plants and the second set of the crop plants, and causing, by the one or more hardware processors, a specific set of electronically controllable sprayer nozzles from amongst a predefined number of electronically controllable sprayer nozzles to operate based on the distinguishing of the crop plants from the weeds, wherein the distinguished crop plants comprises the first set of crop plants with drooping leaves, the second set of crop plants manifesting the elastic change in physical characteristics, and the third set of remaining crop plants, wherein the method further comprises:

obtaining the trained AI model in a training phase by:

extracting a drooping leaf feature from a training dataset stored in a training database;

extracting one or more leaf movement features from the training dataset;

extracting one or more stem bending features from the training dataset; and extracting a plurality of features of a crop plant at different growth stages and at different times-of-day with and without surrounding weeds, wherein the plurality of features are indicative of physical characteristics of the crop plant at the different growth stages at the different times-of-day.

11. The method according to claim 10, further comprising receiving, by the one or more hardware processors, geospatial location correction data from an external device placed at a fixed location in the agricultural field and geospatial location coordinates associated with the boom arrangement mounted on the vehicle.

12. The method according to claim 10, further comprising executing, by the one or more hardware processors, mapping of pixel data of the weeds or the crop plants in an image to distance information from a reference position of the boom arrangement when the vehicle is in motion, wherein the specific set of electronically controllable sprayer nozzles are operated further based on the executed mapping of pixel data.

13. The method according to claim 10, further comprising:

detecting, by the one or more hardware processors, a confidence threshold indicative of a detection sensitivity of the crop plant in the trained AI model; and automatically including or excluding, by the one or more hardware processors, a category of plants to be considered for operation by the one or more hardware processors based on the detected confidence threshold.

14. The method according to claim 13, further comprising updating, by the one or more hardware processors, the confidence threshold in response to a change in a quality parameter of the plurality of FOV s of the plurality of defined areas of the agricultural field.

15. The method according to claim 10, further comprising determining, by the one or more hardware processors, an upcoming time slot to spray a chemical based on the distinguishing of the crop plants from the weeds.

16. The method according to claim 15, wherein the determining of the upcoming time slot to spray the chemical is further based on a size of the crop plant occupied in a two-dimensional space in x and y coordinate direction.

17. The method according to claim 10, further comprising determining, by the one or more hardware processors, one or more regions in the agricultural field where to spray a chemical based on the distinguishing of the crop plants from the weeds.

18. The method according to claim 10, further comprising communicating, by the one or more hardware processors, control signals to operate a plurality of different sets of electronically controlled sprayer nozzles at different time instants during a spray session based on the distinguishing of the crop plants from the weeds.

* * * * *